United States Patent
Eyole et al.

(10) Patent No.: US 11,132,196 B2
(45) Date of Patent: Sep. 28, 2021

(54) APPARATUS AND METHOD FOR MANAGING ADDRESS COLLISIONS WHEN PERFORMING VECTOR OPERATIONS

(71) Applicant: ARM Limited, Cambridge (GB)

(72) Inventors: Mbou Eyole, Soham (GB); Jacob Eapen, Waterbeach (GB); Alejandro Martinez Vicente, Cambridge (GB)

(73) Assignee: Arm Limited, Cambridge (GB)

( * ) Notice: Subject to any disclaimer, the term of this patent is extended or adjusted under 35 U.S.C. 154(b) by 89 days.

(21) Appl. No.: 16/090,357

(22) PCT Filed: Apr. 6, 2017

(86) PCT No.: PCT/GB2017/050960
§ 371 (c)(1),
(2) Date: Oct. 1, 2018

(87) PCT Pub. No.: WO2017/187130
PCT Pub. Date: Nov. 2, 2017

(65) Prior Publication Data
US 2019/0114172 A1 Apr. 18, 2019

(30) Foreign Application Priority Data
Apr. 26, 2016 (GB) .................... 1607261

(51) Int. Cl.
*G06F 9/30* (2018.01)
*G06F 9/34* (2018.01)
*G06F 9/38* (2018.01)
(52) U.S. Cl.
CPC ...... *G06F 9/30036* (2013.01); *G06F 9/30065* (2013.01); *G06F 9/30101* (2013.01); *G06F 9/34* (2013.01)

(58) Field of Classification Search
CPC ............... G06F 9/30018; G06F 9/3004; G06F 9/30036; G06F 9/30065; G06F 9/30101;
(Continued)

(56) References Cited

U.S. PATENT DOCUMENTS 5,471,628 A * 11/1995 Phillips .................... G06F 7/762
712/223
5,546,536 A * 8/1996 Davis ................... G06F 11/2064
711/161
(Continued)

FOREIGN PATENT DOCUMENTS

CN 104969179 10/2015
EP 2 778 907 9/2014
(Continued)

OTHER PUBLICATIONS

Examination Report dated Nov. 21, 2018 in GB Application No. 1607261.3, 5 pages.
(Continued)

*Primary Examiner* — Shawn Doman
(74) *Attorney, Agent, or Firm* — Nixon & Vanderhye P.C.

(57) ABSTRACT

Address collisions are managed when performing vector operations. A register store stores vector operands. Execution circuitry performs memory access operations to move the vector operands between the register store and memory and data processing operations using the vector operands. The execution circuitry may iteratively execute a vector loop, where during each iteration the execution circuitry executes a sequence of instructions to implement the vector loop. The sequence includes a check instruction identifying a plurality of memory addresses. The execution circuitry responds to the check instruction to determine whether an address hazard condition exists among the plurality of memory addresses. For each iteration of the vector loop, the execution circuitry responds to the check instruction deter-
(Continued)

mining an absence of the hazard address condition to employ a default level of vectorization when executing the sequence of instructions to implement the vector loop. But in the presence of the address hazard condition, the execution circuitry employs a reduced level of vectorization to implement the vector loop.

22 Claims, 11 Drawing Sheets

(58) Field of Classification Search
CPC .... G06F 9/34; G06F 9/30072; G06F 9/30076; G06F 9/3834; G06F 9/3838
USPC ................................ 712/7, 222, 224, 225, 2
See application file for complete search history.

(56) References Cited

U.S. PATENT DOCUMENTS

| | | | |
|---|---|---|---|
| 6,219,780 B1* | 4/2001 | Lipasti | G06F 9/3824 712/206 |
| 8,019,976 B2 | 9/2011 | Gonion et al. | |
| 2008/0288744 A1 | 11/2008 | Gonion et al. | |
| 2008/0288759 A1 | 11/2008 | Gonion et al. | |
| 2010/0250802 A1* | 9/2010 | Waugh | G06F 13/4022 710/100 |
| 2011/0153989 A1* | 6/2011 | Rajwar | G06F 9/30087 712/208 |
| 2013/0080737 A1* | 3/2013 | Reid | G06F 8/443 712/4 |
| 2014/0089634 A1 | 3/2014 | Lee et al. | |
| 2015/0089187 A1 | 3/2015 | Gonion | |
| 2016/0179528 A1* | 6/2016 | Hughes | G06F 9/30036 712/5 |

FOREIGN PATENT DOCUMENTS

| | | |
|---|---|---|
| JP | 2-28765 | 1/1990 |
| WO | 2014/142972 | 9/2014 |

OTHER PUBLICATIONS

International Search Report and Written Opinion of the ISA for PCT/GB2017/050960 dated Jul. 21, 2017, 11 pages.
Combined Search and Examination Report for GB1607261.3 dated Oct. 14, 2016, 8 pages.
Intel Architecture Instruction Set Extensions Programming Reference, Intel, Feb. 2016, 1180 pages.
J. Gonion, "Macroscalar Processor Architecture—A Prototype for Ubiquitous Vectorization" Feb. 2008, 117 pages.
Office Action for TW Application No. 106113721 dated Nov. 27, 2020, 3 pages.
Office Action for JP Application No. 2018-554767 dated Apr. 1, 2021, 2 pages.
Office Action for KR Application No. 10-2018-7033191 dated Jun. 29, 2021, 5 pages.

* cited by examiner

```
for (x = 0; x < SIZE; x++) {
    A[x] = B[x];
}
```

Initially:

If VL = 8; (A − B) = 3 and 0 < 3 <VL => CONFLICT DELETED

Contents of memory after scalar operations:

Contents of memory after unguarded vector operations:

Guard predicate generated by CHECK instruction:

CHECK<T> Pd.<T>, Pg/Z, A, B

APPARATUS AND METHOD FOR MANAGING ADDRESS COLLISIONS WHEN PERFORMING VECTOR OPERATIONS

This application is the U.S. national phase of International Application No. PCT/GB2017/050960 filed Apr. 6, 2017 which designated the U.S. and claims priority to GB Patent Application No. 1607261.3 filed Apr. 26, 2016, the entire contents of each of which are hereby incorporated by reference.

The present technique relates to an apparatus and method for managing address collisions when performing vector operations.

One known technique for improving performance of a data processing apparatus is to provide circuitry to support execution of vector operations. Vector operations are performed on at least one vector operand, where each vector operand comprises a plurality of elements. Performance of the vector operation then involves applying an operation repetitively across the various elements within the vector operand(s).

In certain implementations, it is also known to provide vector processing circuitry (often referred to as SIMD (Single Instruction Multiple Data) processing circuitry) which provides multiple lanes of parallel processing in order to perform operations in parallel on the various elements within the vector operands.

Through the use of vector operations, significant performance benefits can be realised when compared with the performance of an equivalent series of scalar operations.

Traditional programs that are amenable to SIMD usually perform regular memory accesses and often follow a linear memory addressing scheme which makes the transformation from scalar code to vector code straightforward. In such situations there are no dependencies between loop iterations and vectorisation is uncomplicated because there is no race condition possible when elements of a vector are processed concurrently. Unfortunately, in many real-world programs that one might wish to vectorise for performance, there exist non-trivial amounts of dependencies between iterations in the scalar code. In such cases it can be difficult to predict the frequency of the address conflicts which might manifest at run-time if the code is vectorised.

Accordingly, it has often been necessary at the compilation stage to take a conservative approach, as a result of which code may not be vectorised if the presence of address conflicts cannot be accurately predicted, and accordingly any potential performance gains will be sacrificed.

Previous attempts at trying to introduce mechanisms to dynamically analyse address conflicts in vectors of addresses have significant latency issues, which can limit any potential benefits to be realised from their use.

It would be desirable to provide a mechanism which alleviates the above problems.

In one example configuration there is provided an apparatus, comprising: a register store to store vector operands, each vector operand comprising a plurality of elements; execution circuitry to execute instructions in order to perform operations specified by the instructions, the execution circuitry comprising access circuitry to perform memory access operations in order to move the vector operands between the register store and memory, and processing circuitry to perform data processing operations using said vector operands; the execution circuitry being arranged to iteratively execute a vector loop, during each iteration the execution circuitry being arranged to execute a sequence of instructions to implement the vector loop, said sequence including a check instruction identifying a plurality of memory addresses, and the execution circuitry being responsive to execution of the check instruction to determine whether an address hazard condition exists amongst the plurality of memory addresses; for each iteration of the vector loop, the execution circuitry being responsive to execution of the check instruction determining an absence of said address hazard condition, to employ a default level of vectorisation when executing the sequence of instructions to implement the vector loop, and being responsive to execution of the check instruction determining a presence of said address hazard condition, to employ a reduced level of vectorisation when executing the sequence of instructions to implement the vector loop.

In another example configuration there is provided a method of managing address collisions when performing vector operations in an apparatus having a register store to store vector operands, each vector operand comprising a plurality of elements, and execution circuitry to execute instructions in order to perform operations specified by the instructions, the execution circuitry performing memory access operations in order to move the vector operands between the register store and memory, and performing data processing operations using said vector operands, the method comprising: iteratively executing a vector loop; during each iteration, executing within the execution circuitry a sequence of instructions to implement the vector loop, said sequence including a check instruction identifying a plurality of memory addresses, and the execution circuitry being responsive to execution of the check instruction to determine whether an address hazard condition exists amongst the plurality of memory addresses; and for each iteration of the vector loop, in response to execution of the check instruction determining an absence of said address hazard condition, employing a default level of vectorisation when executing the sequence of instructions to implement the vector loop, and in response to execution of the check instruction determining a presence of said address hazard condition, employing a reduced level of vectorisation when executing the sequence of instructions to implement the vector loop.

In a yet further example configuration there is provided a computer program product storing in a non-transitory form a computer program for controlling a computer to provide a virtual machine execution environment for program instructions corresponding to an apparatus as per the configuration set out above.

In a still further example configuration there is provided an apparatus, comprising: register store means for storing vector operands, each vector operand comprising a plurality of elements; execution means for executing instructions in order to perform operations specified by the instructions, the execution means comprising access means for performing memory access operations in order to move the vector operands between the register store means and memory, and processing means for performing data processing operations using said vector operands; the execution means for iteratively execute a vector loop, during each iteration the execution means for executing a sequence of instructions to implement the vector loop, said sequence including a check instruction identifying a plurality of memory addresses, and the execution means for determining, responsive to execution of the check instruction, whether an address hazard condition exists amongst the plurality of memory addresses; for each iteration of the vector loop, the execution means being responsive to execution of the check instruction determining an absence of said address hazard condition, for employing a default level of vectorisation when executing the sequence of instructions to implement the vector loop, and being responsive to execution of the check instruction determining a presence of said address hazard condition, for employing a reduced level of vectorisation when executing the sequence of instructions to implement the vector loop.

The present technique will be described further, by way of example only, with reference to embodiments thereof as illustrated in the accompanying drawings, in which.

Figure 5:
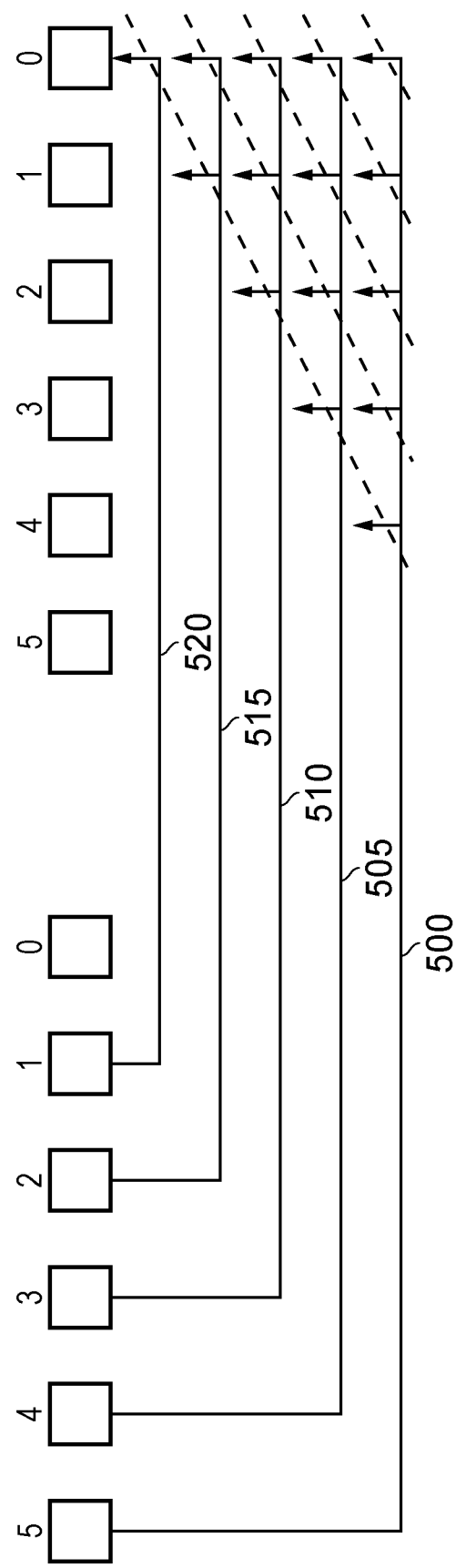
Figure 6:
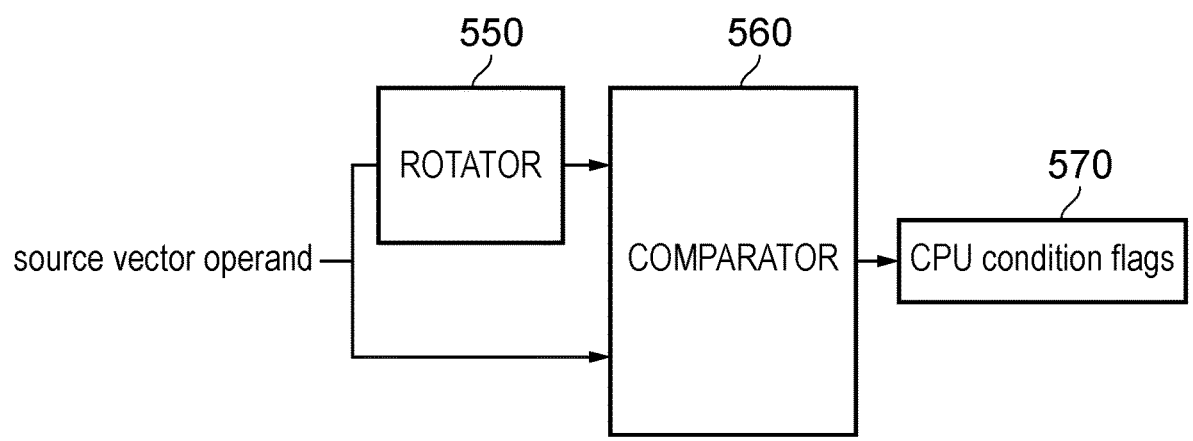
Figure 8:
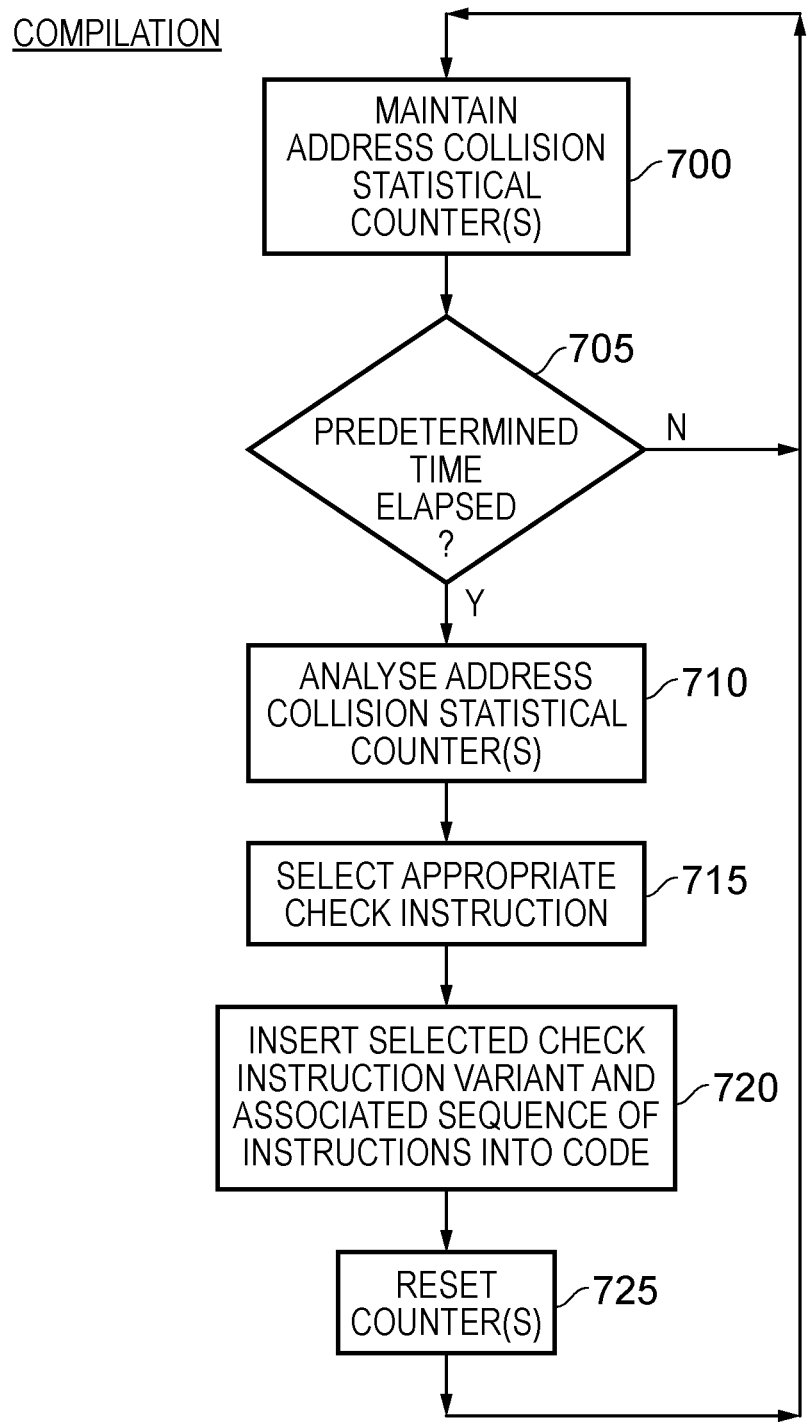
Figure 9:
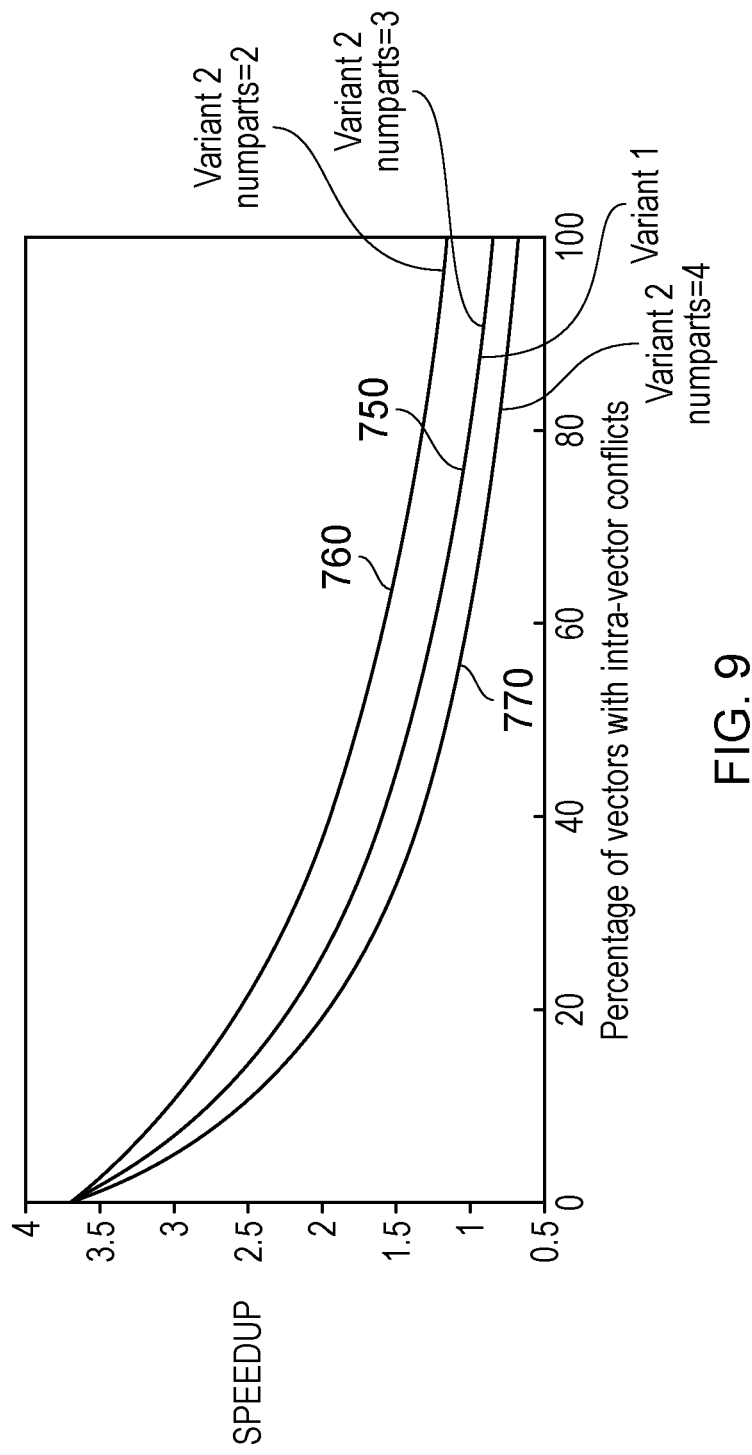
Figure 10:
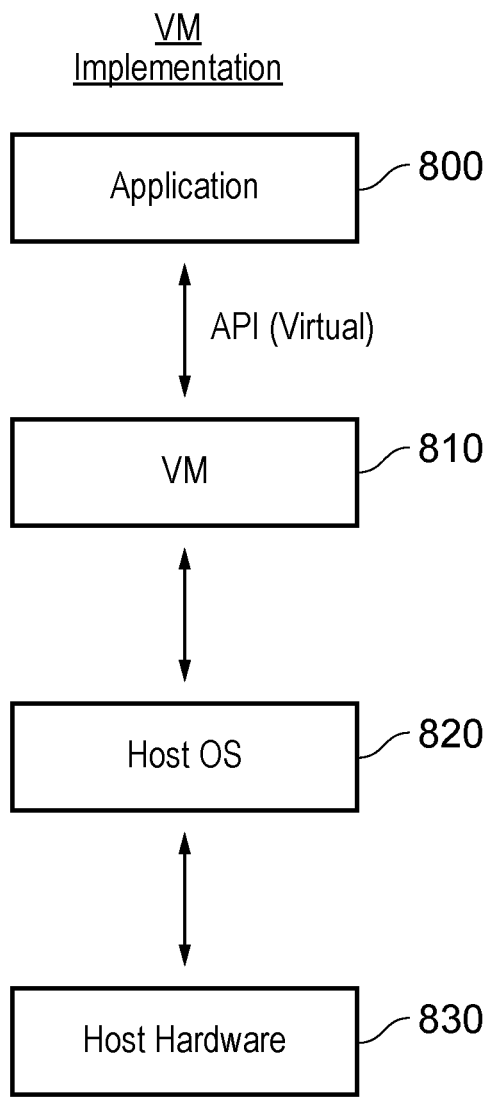

FIG. 5 schematically illustrates how the comparison required during the execution of a checking instruction can be grouped in accordance with one embodiment;

FIG. 6 block diagram illustrating how a rotator and comparator can be used to merge multiple address comparisons according to the groupings shown in FIG. 5, in accordance with one embodiment;

FIG. 7A to 7E are diagrams used to illustrate an alternative variant of a checking instruction that may be used in one embodiment where the relevant address vectors for which address conflict detection is required contain contiguous memory addresses;

FIG. 8 is a flow diagram schematically illustrating how a compilation operation may be performed in order to determine an appropriate form of check instruction to use within a particular vector loop, in accordance with one embodiment;

FIG. 9 is a graph illustrating potential speed up of vectorised code over a scalar implementation, dependent on the type of check instruction inserted within the vector loop;

FIG. 10 schematically illustrates a virtual machine implementation of the data processing apparatus in accordance with one embodiment.

Before discussing the embodiments with reference to the accompanying figures, the following description of embodiments is provided.

In one embodiment, an apparatus is provided that has a register store to store vector operands, where each vector operand comprises of plurality of elements, and execution circuitry to execute instructions in order to perform operations specified by those instructions. The execution circuitry has access circuitry to perform memory access operations in order to move the vector operands between the register store and memory, and processing circuitry to perform data processing operations using the vector operands. The execution circuitry may be arranged to iteratively execute a vector loop, and during each iteration will execute a sequence of instructions to implement the vector loop. In accordance with the described embodiments, the sequence includes a check instruction identifying a plurality of memory addresses, and the execution circuitry is responsive to the execution of the check instruction to determine whether an address hazard condition exists amongst the plurality of memory addresses. In accordance with the described embodiments, for each iteration of the vector loop, the execution circuitry is responsive to execution of the check instruction determining an absence of the address hazard, to employ a default level of vectorisation when executing a sequence of instructions to implement the vector loop. In contrast, in response to execution of the check instruction determining a presence of the address hazard condition, the execution circuitry is arranged to employ a reduced level of vectorisation when executing the sequence of instructions to implement the vector loop.

The described technique provides an efficient mechanism for dynamically determining the presence or absence of an address hazard condition during each iteration of a vector loop. The approach provides a low latency solution, by enabling the level of vectorisation employed during any particular iteration of the vector loop to be directly influenced by the result of executing the check instruction within that iteration of the vector loop. In particular, whilst the default level of vectorisation is provided, for any particular iteration where execution of the check instruction determines presence of an address hazard condition, the execution circuity can be arranged to directly employ a reduced level of vectorisation in order to deal with that address hazard condition, the mechanism hence enabling dynamic switching in the level of vectorisation employed during each iteration of the vector loop.

Such an approach enables code to be vectorised, and for resultant address hazards that may arise to be dealt with efficiently on a vector loop iteration by vector loop iteration basis. Due to the low latency associated with the mechanism, it has been found to provide significant performance benefits in a variety of situations where address conflicts can arise in performance of the vector operations, when compared with an equivalent scalar processing. Since the level of vectorisation employed can be dynamically altered on each iteration of the vector loop, it can provide significant performance benefits in situations where some iterations have address conflicts and others do not.

There are a number of ways in which the default level of vectorisation and reduced level of vectorisation can be implemented. In one embodiment, the execution circuitry is responsive to execution of the check instruction determining the absence of the address hazard condition, to employ the default level of vectorisation by executing a first plurality of instructions within the sequence of instructions to implement the vector loop. In contrast, the execution circuitry is responsive to execution of the check instruction determining the presence of the address hazard condition, to employ the reduced level of vectorisation by iteratively executing a second plurality of instructions within the sequence of instructions to implement the vector loop.

Accordingly, in such an embodiment, the result of execution of the check instruction directly influences the control flow within the loop, by providing an efficient fallback path containing a second plurality of instructions when the address hazard condition is detected. By the efficient provision of a fallback path, such an approach enables the vectorisation of scalar code which would otherwise be considered unable to be vectorised. In particular, the scalar code can be vectorised, and through execution of the check instruction during each iteration of the vector loop, handling can pass to the fallback path whenever the address hazard condition is detected. Iterative execution of the second plurality of instructions within that fallback path can then ensure that the correct processing takes place by avoiding the address hazard.

There are a number of ways in which execution of the check instruction can be caused to influence the level of vectorisation employed within the current iteration of the vector loop. In one embodiment, the execution circuity is responsive to execution of the check instruction to generate result data indicating whether the address hazard condition exists, for reference by a subsequent instruction in the sequence.

The result data can take a variety of forms. For example, it may be written into a system register for reference by a subsequent instruction. Alternatively, the result data may be directly represented in the updating of one or more flags, such as condition flags referenced by the execution circuitry. By such an approach, the operation of a subsequent instruction may be influenced by the current state of those flags as updated by the result data. For example, in one embodiment the subsequent instruction is a branch instruction which, when executed by the execution circuitry, references the one or more flags in order to determine whether to execute the first plurality of instructions or whether to iteratively execute the second plurality of instructions. Accordingly, by such an approach, the branch instruction may be arranged to conditionally branch to the second plurality of instructions dependent on the flags set as a result of executing the check instruction. Hence, in the absence of the address hazard condition, execution of the branch instruction will merely cause the processing to proceed with the first plurality of instructions, whereas in the presence of the hazard condition, execution of the branch instruction will cause the instruction flow to branch to the second plurality of instructions, which can then be executed iteratively in order to implement the processing required by the current iteration of the vector loop.

The second plurality of instructions may take a variety of forms. In one embodiment they comprise scalar instructions which cause the execution circuitry to operate on individual elements, and the number of iterative executions of the second plurality of instructions required to implement the vector loop is dependent on a number of active elements of the vector operands associated with the default level of vectorisation. Hence, purely by way of example, if there were eight active elements within the vector operands associated with the default level of vectorisation, then the second plurality of instructions may be executed eight times in order to implement the current iteration of the vector loop, during each iteration the second plurality of instructions operating on scalar values associated with one of the lanes of parallel processing that would have been executed upon had the default level of vectorisation been maintained, and hence the first plurality of instructions executed.

However, in an alternative embodiment, the second plurality of instructions may not comprise scalar instructions, and instead the second plurality of instructions may be comprised of vector instructions that operate on a reduced number of vector elements when compared with the default level of vectorisation. For example, in one embodiment, the execution circuitry is responsive to execution of the check instruction to generate a guard predicate with an initial predicate value, and the second plurality of instructions comprise vector instructions which cause the execution circuitry to operate in parallel on a subset of the elements of one or more vector operands, said subset being identified by the guard predicate. On each iteration of the second plurality of instructions, the predicate value of the guard predicate is updated to exclude any elements of the one or more vector operands operated on by any preceding iteration. Hence, in accordance with such an approach, it is still necessary to iteratively execute the second plurality of instructions in order to process all of the elements of the vector operands associated with the current iteration of the vector loop, but in each iteration of the second plurality of instructions multiple of the elements are processed in parallel. This enables the level of vectorisation to be scaled back in order to avoid the address hazard issue, but whilst still enabling a level of vectorisation to be achieved within the current iteration of the vector loop.

In one embodiment, a master predicate can be used to identify the active elements within the vector operands. Hence, it may be that not all elements specified within a vector operand are processed within a current iteration of a vector loop, even when the default level of vectorisation is employed. Hence, when it is decided in the presence of the address hazard condition to adopt the fallback path comprising the second of plurality instructions, it is also important to ensure that any elements of the vector operands that are not identified by the master predicate as being active elements are not operated upon. In one embodiment, this is achieved by constraining the guard predicate to identify a subset of the elements that are active elements identified by the master predicate.

Whilst in some embodiments as described above, the reduced level of vectorisation is implemented by providing a separate fallback path, and causing execution of the check instruction to directly influence control flow within the loop so that that fallback path is used in the presence of the address hazard condition, in alternative embodiments it may not be necessary to provide such a separate fallback path. In particular, in accordance with an alternative embodiment, the default level of vectorisation identifies a first number of active elements, and the execution circuitry is arranged, in response to execution of the check instruction determining the absence of the address hazard condition, to process the first number of elements in parallel when executing the sequence of instructions to implement the vector loop. However, the execution circuitry is responsive to execution of the check instruction to generate a control output that reduces the number of active elements to a second number of active elements less than the first number when execution of the check instruction determines the presence of the address hazard condition, to cause the execution circuitry to employ the reduced level of vectorisation by processing the second number of elements in parallel when executing the sequence of instructions to implement the vector loop.

Hence, in accordance with such an approach, rather than causing a change in control flow dependent on the result of execution of the check instruction, execution of the check instruction can be used to directly alter the number of active elements processed dependent on the check result. Thus, during each iteration of the vector loop, the number of active elements processed may be altered dependent on the result of the check instruction for that particular iteration. Hence, for any iteration where the address hazard condition is not detected, the default, first, number of elements may be executed in parallel, but for any iteration where the address hazard condition is detected, then processing may proceed with a reduced number of active elements as determined by the result of the check instruction. This enables the check result to directly control the number of elements processed during each iteration of the vector loop, enabling dynamic adjustment of the degree of vectorisation on an iteration-by-iteration level.

In one embodiment, at the start of each iteration of the vector loop, the execution circuitry is arranged to revert to employing the default level of vectorisation. Hence, any scaling back in the level of vectorisation employed is reset at each start of the vector loop, enabling the full, default, level of vectorisation to be employed wherever possible.

There are a number of ways in which the second number of active elements to be processed in the presence of the address hazard condition can be identified. In one embodiment, the control output generated by the execution circuitry on executing the check instruction comprises a guard predicate identifying the active elements forming the second number of active elements.

The nature of the check operation performed on executing the check instruction can vary dependent on embodiment. In one embodiment, the check instruction specifies at least one vector operand comprising a plurality of active address elements, and the execution circuitry is arranged, on executing the check instruction, to compare each active address element with each other active address element in order to determine whether the address hazard condition exists.

In an alternative embodiment, the check instruction may specify a first address associated with a first sequence of contiguous addresses and a second address associated with a second sequence of contiguous addresses, and the execution circuitry is arranged, on executing the check instruction, to determine the presence of the address hazard condition dependent on a difference between the first address and the second address.

Such an approach can provide an efficient mechanism for performing the necessary comparison in situations where the relevant vectors of addresses that could give rise to address conflicts each specify a sequence of contiguous addresses.

There are a number of ways in which the presence of the address hazard condition can be detected based on the calculated difference. For example, in one embodiment, assuming the first address to be x and the second address to be z, if the difference z–x is greater than or equal to the vector length, or is negative or 0, then it can be ensured that there will be no address hazard condition. However, if the difference z–x is less than the vector length and greater than 0, then an address hazard condition will arise.

In an alternative embodiment, it may instead be decided to perform a check to detect situations where the absolute difference between the first address and the second address is not greater than or equal to the vector length. If the absolute difference is less than the vector length, this can indicate the presence of the address hazard condition. However, it should be noted that a check based on absolute differences may produce some false positives, since there are actually no race conditions when the signed integer result of the calculation z–x is less than the vector length and also negative or equal to 0.

Whilst in one embodiment the check instruction may be arranged to cause the execution circuitry to perform the required check operation and produce the result data needed to directly influence the remaining handling of the vector loop iteration, in an alternative embodiment further performance improvements can be obtained by combining the check operation with other operations. For example, in one embodiment the check instruction is a check and memory access instruction, the execution circuitry being responsive to execution of the check and memory access instruction to perform a check operation to determine whether the address hazard condition exists amongst the plurality of memory addresses whilst also performing a memory access operation in respect of the plurality of memory addresses.

The memory access operation can take a variety of forms. For example, it may take the form of a gather operation used to retrieve data from memory using the plurality of memory addresses specified by the check and memory access instruction. By merging the functionality of the check instruction with a memory access instruction, it is possible to hide the latency of the check operation. It has also been found that in certain instances some of the processing required in order to perform the memory access operation can be reused for the check operation.

Further benefits can also be achieved by combining the check and memory access operations into a single instruction. For example, the execution circuitry may be arranged, on determining the presence of the address hazard condition, to terminate any remaining portion of the memory access operation. Hence, this allows early termination of some parts of the memory access operation dependent on the address hazard check results. This can hence avoid the performance of unnecessary operations and hence improve overall efficiency of the apparatus.

In one embodiment, the processing circuitry may comprise dedicated check circuitry to perform a check operation on execution of the check instruction. However, in alternative embodiments, it may not be necessary to provide such dedicated check circuitry, and instead an existing processing unit within the processing circuitry that is provided for performing data processing operations may be re-used for performing the necessary check operation on execution of the check instruction.

In one such embodiment, rotator circuitry and comparator circuitry within the processing unit are used to merge one or more address comparisons required during the performance of the check operation. Hence, existing hardware within the processing unit may be used to improve the efficiency of performance of the required address comparisons when performing the check operation.

As mentioned earlier, in some embodiments the result of the check operation can be used to directly update condition flags referred to by the execution circuitry when executing one or more subsequent instructions within the vector loop. However, in an alternative embodiment the apparatus may further comprise a hazard check status register into which the execution circuitry is arranged to store the result data produced by execution of the check instruction. This can provide some benefits, for example in situations where instruction encoding space is very limited. For example, in such a situation it may be decided to combine the check operation with another operation via a single instruction, such as in the earlier example of the check and memory access instruction. Use of the results of the check operation could then be disregarded in situations where the check operation was not needed. In particular, in such a scenario, although the hazard check status register would be updated with the results, the subsequent instructions would not make reference to the hazard check status register, and accordingly execution of the instruction would effectively just perform the specified memory access operation. This hence enables a single instruction to be arranged to perform a standard memory access operation, or a memory access operation with associated address conflict checking, dependent on need. In situations where it was desired to make use of the address conflict detection, a subsequent instruction could, for example, be arranged to read the contents of the hazard check status register and set the condition flags appropriately, whereafter a branch instruction could then be executed as discussed earlier, with the control flow then being dependent on how the condition flags have been set, and hence whether an address hazard condition had been detected or not. In another embodiment, the check and memory access instruction could set the condition flags directly.

In one embodiment, each vector operand comprises N elements, and N active elements are associated with the default level of vectorisation so that the execution circuitry is responsive to execution of the check instruction determining an absence of said address hazard condition, to process N elements in parallel when executing the sequence of instructions to implement the vector loop. Hence, in such an embodiment, all of the elements of each specified vector operand are assumed to be active elements, and are subject to appropriate processing.

However, in an alternative embodiment, each vector operand comprises N elements, a master predicate identifies as active elements a number of elements less than or equal to N, and the default level of vectorisation corresponds to the active elements identified by the master predicate, so that the execution circuitry is responsive to execution of the check instruction determining an absence of the address hazard condition, to process in parallel the active elements identified by the master predicate when executing the sequence of instructions to implement the vector loop. Hence, through use of a master predicate, a subset of the elements specified within each vector operand can be identified as active elements to be processed within the vector loop iteration.

In some embodiments, multiple different variants of the check instruction may be provided. For example, one variant may be arranged to set one or more flags whenever the address hazard condition is detected, but not to capture any information about which address elements are giving rise to the address hazard, whilst another variant may be arranged to produce a guard predicate whose value is dependent on where within the elements of the input vector(s) the address collision was detected. The inventors realized that different variants of the check instruction may enable different levels of performance improvement to be achieved, dependent on the statistical nature of the address collisions detected in practice. In one embodiment, the apparatus can be adapted to maintain information about the address hazard conditions detected when executing sequences of instructions, with that information being made available to a compiler to enable recompilation of the code over time.

In particular, in one embodiment the apparatus further comprises counter circuitry to maintain history data relating to occurrences of the address hazard condition for previously executed instruction sequences, and the execution circuitry is arranged to operate under control of an instruction set that includes a plurality of different types of check instruction. The history data is then made available to a compiler to enable the compiler to determine which type of check instruction to use within the vector loop taking account of the history data.

The compiler may be a static compiler, or may be a dynamic compiler used at run-time to dynamically alter the instruction sequence executed dependent on the history data.

The history data can take a variety of forms. For example, it may in one embodiment merely count occurrences of the address hazard condition over a period of time. In an alternative embodiment, it may in addition, or alternatively, seek to capture the number of address conflicts detected within each vector length. It has been found that the type of check instruction used to best improve performance can vary not only dependent on the overall number of address collisions detected, but also dependent on whether those address collisions are clustered within particular vector lengths, or distributed more evenly within the iterations of the vector loop. By maintaining history data that captures both the overall number of the address collisions, and information about how those address collisions are clustered within vector length groups, this can provide the compiler with suitable information to determine how best to use the different variants of the check instruction in order to improve performance.

Particular embodiments will now be described with reference to the Figures.

As mentioned earlier, in many real-world programs which one might wish to vectorise for performance, there can exist non-trivial amounts of address dependencies between iterations in the scalar code. For the sake of illustration, a number of use cases are considered. As a first use case, the histogram problem will be considered, where it is desired to perform the following operation:

```
for (x = 0; x < SIZE; x++) {
    A[C[x]]++;
}
```

Essentially, the operation involves, for a sequence of values of x, obtaining data from an array C that is to be used to form an address, accessing the data value A at that address, and then incrementing that data value by 1.

If it can be guaranteed that there are no race conditions (i.e. no address conflicts), then the vector pseudocode for the critical loop may be represented as follows:

Perform a contiguous read from array C at offset x into vector register zC

Gather from array A using pointers in zC and write result in vector register zA

Add #1 to every element in zA

Scatter vector zA using pointers in zC

Increment x by vector length

Check that x is less than the size of the array and continue iterating if that is the case Hence, vectors of pointers are obtained from an array C and stored in a vector register zC, and then data values from an array A are gathered using the various pointers in the vector register zC. Once the vector register zA is populated with the data values obtained from the array A using the pointers in the register zC, then the numeric value 1 is added to every data value, and the resultant data values are scattered back to memory using the same pointers in the register zC. This process is repeated until x is no longer less than the size of the array specified for the operation.

It will be appreciated that by vectorising the histogram operation, this can significantly increase performance. However, if there is the possibility that some entries in the array C might refer to the same address element, and if such address collisions happen to be present in a single vector of indices (i.e. the vector of addresses used in one iteration of the vector loop), then the above approach would lead to incorrect results (in particular, one or more data values may not be incremented by the correct amount). As will be discussed in more detail later with reference to the described embodiments, instead of avoiding vectorisation altogether (which would lead to low performance), the described techniques make use of a check instruction within the vector loop that enables the aforementioned race conditions to be detected at run time, and appropriate action taken.

As a second use case, consider the memory copy (Memcpy) problem, which requires performance of the following operation:

```
for (x = 0; x < SIZE; x++) {
    A[x] = B[x];
}
```

This operation copies data from one array to another. This code is usually a good candidate for vectorisation as there is no control code inside the loop. However, the code cannot be safely vectorised without providing sufficient hints to the compiler because it is unclear whether vectorisation leads to any address conflicts or not (arrays A and B might overlap). In many instances, there are actually no hazards at run time, but compilers generally take a conservative approach and will not vectorise code where ambiguities are present, thereby sacrificing any performance gains. However, as will be discussed later, by adopting the use of the check instructions described herein, it is possible to identify potential hazards at run time, and take appropriate corrective action, hence allowing the performance improvements of vectorisation to be benefited from, even when at compile time it is not known whether any hazards will or will not occur when the code is executed.

Figure 1:
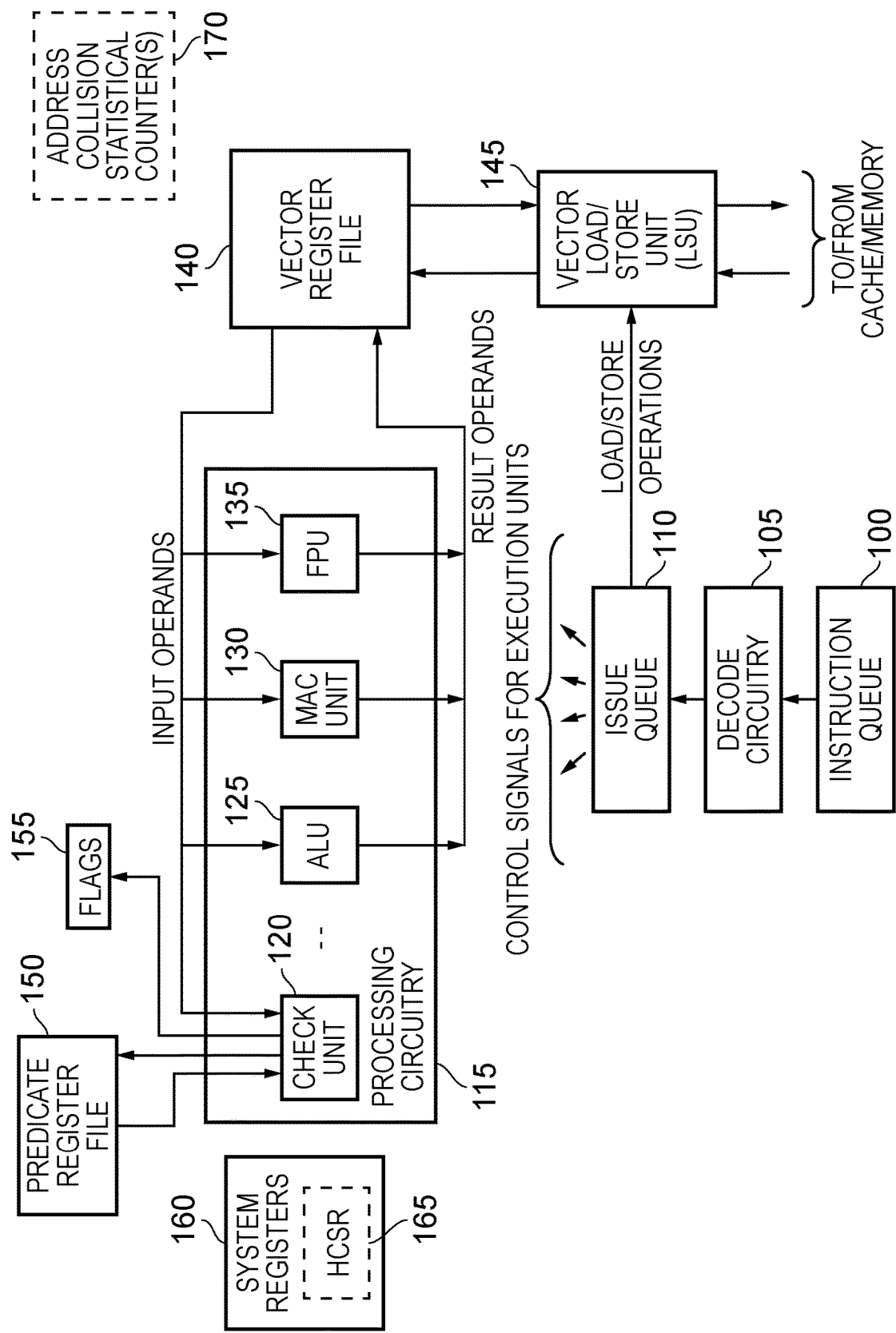
FIG. 1 is a block diagram of an apparatus in accordance with one embodiment.

Before discussing in more detail the check instructions provided in accordance with the described embodiments, an apparatus upon which the instructions may be executed will first be described with reference to FIG. 1. In particular, FIG. 1 illustrates a data processing apparatus in accordance with one embodiment, where instructions to be executed by the apparatus are placed within an instruction queue 100 from where they are passed to decode circuitry 105. The decode circuitry decodes the instructions in order to generate certain control information placed within the issue queue 110, such control information sometimes being referred to as micro-ops. The issue queue will then dispatch appropriate control information to the relevant processing units forming execution circuitry of the apparatus, in order to cause the operations specified by the received instructions to be performed.

The execution circuitry may be considered to comprise the processing circuitry 115 that consists of a number of processing units to perform particular data processing operations, and the vector load/store unit (LSU) 145 used to move vector operands between memory and the vector register file 140 in either direction.

In the example illustrated in FIG. 1, the processing circuitry 115 is formed of a plurality of vector processing units 120, 125, 130, 135. Accordingly, floating point operations identified in the issue queue 110 will be forwarded to the floating point unit (FPU) 135 for handling, multiplication and/or multiply accumulate operations will be passed to the multiply accumulate (MAC) unit 130 and standard arithmetic operations will be passed to the arithmetic logic unit (ALU) 125. A dedicated check unit 120 can be provided for executing the check instructions to be discussed in more detail later, in order to perform the necessary address comparison operations to determine whether an address hazard condition exists. As will be discussed later, dependent on the variant of the check instruction executed, the result of the required address comparison operations may cause one or more flags 155 to be set and/or a guard predicate to be set within one of the predicate registers of a predicate register file 150. As an alternative to having a separate, dedicated, check unit, one of the pre-existing units within the processing circuitry may be used to perform the operations required to execute the check instructions. For example, as will be discussed later, in one embodiment the ALU 125 may be used to execute the check instructions, and to set the flags 155 and/or guard predicate within the predicate register file 150 accordingly.

The various input operands required by the vector processing circuitry 115 will be read from source registers within the vector register file 140. In addition, result operands generated by each of the units will typically be stored back to destination registers within the vector register file 140. Load and store instructions will be used to cause corresponding load and store operations to be performed by the LSU 145 in order to cause operand data to be loaded from memory into specified registers of the vector register file 140, or for the contents of one or more of the vector registers to be stored back to memory.

A number of system registers 160 may be provided, whose contents are used to control the operation of the data processing apparatus. As will be described in more detail later, in one embodiment, as an alternative to directly setting flags 155, the result of the check operation may be stored within a Hazard-Check Status Register (HCSR) 165 for later reference by one or more subsequent instructions executed by the processing circuitry.

As will also be discussed in more detail later, one or more address collision statistical counters 170 may be provided for maintaining history data as to the number of address collisions detected when performing vector operations within the apparatus. In situations where the instruction set available to the apparatus includes a number of different variants of the check instruction, it has been found that by maintaining appropriate statistical counters about address collisions, this enables compiler code to evaluate which variants of the check instructions are most likely to give better performance improvement, allowing for re-compilation of the code to take account of the history data maintained by the statistical counters. This will be discussed later with references to FIGS. 8 and 9.

In accordance with the embodiments described hereafter, the apparatus of FIG. 1 may be arranged to iteratively execute a vector loop, and during each iteration the execution circuitry is arranged to execute a sequence of instructions to implement the vector loop, where that sequence includes a check instruction that identifies a plurality of memory addresses that are to be checked for the presence of an address hazard condition. In accordance with the described embodiments a number of different variants of the check instruction are envisaged. A first variant is as follows:

Variant 1: CHECK Pg, Zn.<T>    //flag-setting only

The input operand Zn identifies a vector register containing a vector of address elements. The operand Pg identifies a predicate register containing a master predicate that is used to identify which of the address elements within the vector operand Zn are active address elements. The address elements may directly identify addresses, or instead may be pointers/offsets that are combined with a base address to identify the address itself. In one embodiment, the specification of such a master predicate may be optional, and in the absence of a specified master predicate it is assumed that all of the address elements within the vector operand Zn are active address elements. Finally, the parameter T identifies a data type, for example 32-bit data, 64-bit data, etc. This hence identifies the size of each element within the vector operand. On execution of the check instruction, the processing circuitry 115 compares each active address element with each other active address element in order to determine if any of the address elements are the same, and upon detecting such a situation generates an output which indicates the presence of an address hazard condition. In accordance with the above-mentioned variant 1, the output causes one or more condition flags 155 to be set indicative of the presence or absence of the address hazard condition.

The use of the variant 1 check instruction will now be discussed in more detail with reference to FIG. 2, when considering the earlier described first use case of the histogram problem. At step 200, the offset x is initialised, whereafter at step 205 a series of pointers (address elements) are loaded into the vector register zC using the offset x. The contiguous address load performed at step 205 using the offset x could take master predicate information into account if desired. Thereafter, at step 210, the pointers that have been loaded into the register zC are checked for address collisions by execution of the above-mentioned check instruction, and the flags 155 are set accordingly. If a master predicate is specified, then the check operation will be constrained by the master predicate to exclude any inactive address elements.

At step 215, it is then determined whether the flags indicate the presence of an address collision. If not, then this indicates that all of the active address elements in the vector register zC are unique, and accordingly a default level of vectorisation can be adopted for the current iteration of the vector loop. For the sake of illustration, it will be assumed that there are eight active address elements A, B, C, D, E, F, G and H, and hence when adopting the default level of vectorisation, all eight addresses are processed in parallel.

Accordingly, in the absence of any address collision being detected by performance of the check operation, the process proceeds to step 220 where data is gathered from memory using all of the address pointers in the vector operand register zC with the resulting data being written into the vector register zA. Thereafter, at step 225, the required vector operation or vector operations are performed on the loaded data, with the results being written back into the vector register zA. Considering the earlier histogram problem, all that is required at this step is to add one to each of the data values that has been loaded into the register zA, but it would be appreciated that for other types of operation one or more different vector operations could instead be performed at step 225. If desired step 225 can be constrained so as to not process any data relating to inactive lanes of parallel processing. For example, it may be useful to take account of the master predicate when performing the vector operations in order to avoid the possible occurrence of any exceptions that are associated with inactive lanes.

At step 230, the data in the vector register zA is then scattered back to memory using the same address pointers in the operand register zC. The scatter operation is constrained by the master predicate if a master predicate has been specified.

At this point, it will be appreciated that the vector loop iteration has processed in parallel eight lanes of data, and accordingly eight addresses have been considered. Accordingly, at step 235, the offset x is incremented by the vector length, whereafter it is determined at step 240 whether there is any more data to process. If not, then the process ends at step 245, but assuming that there is more data to process, then the process returns to step 205 to perform the next iteration of the vector loop.

Figure 2:
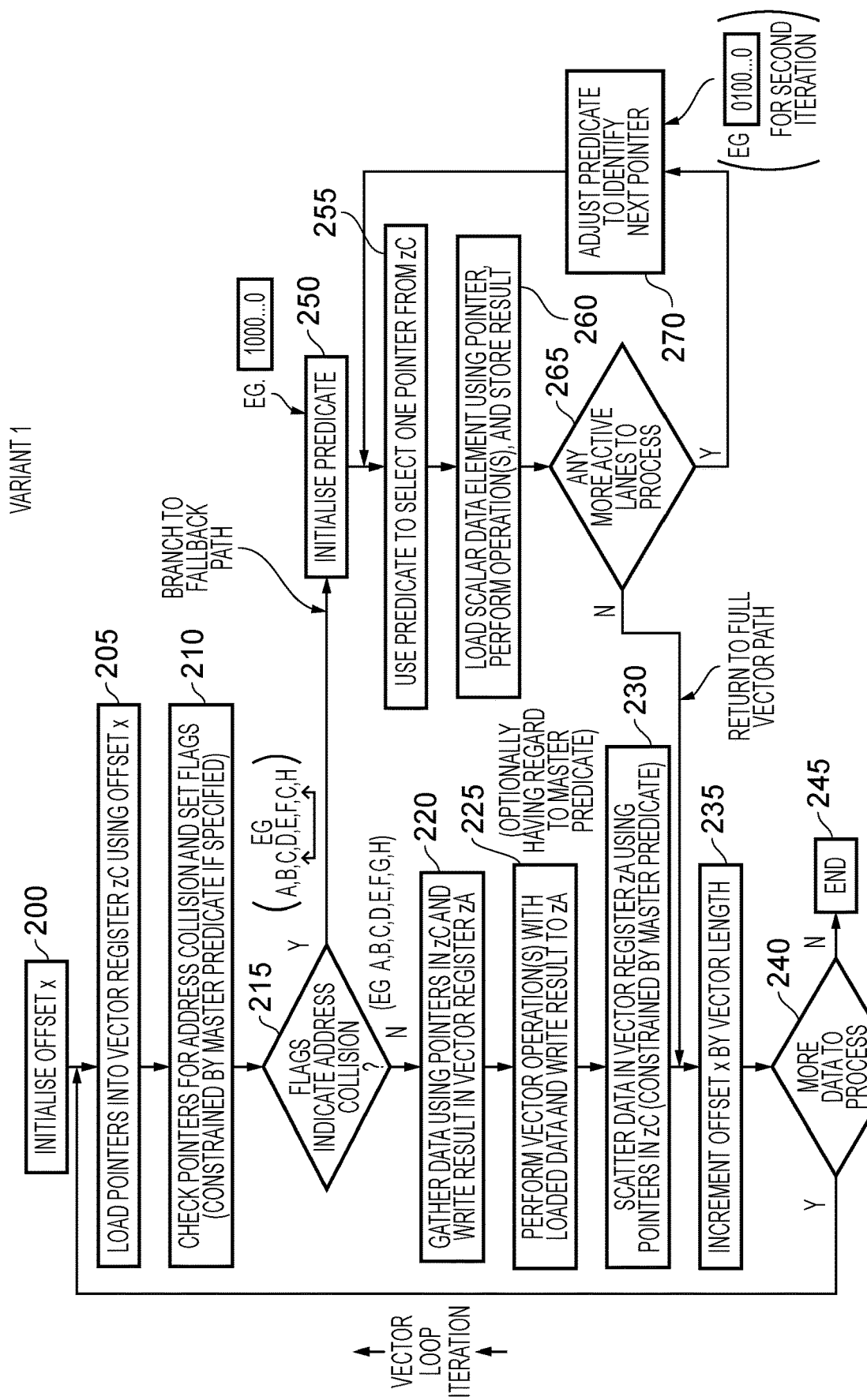
FIG. 2 is a flow diagram illustrating the execution of a vector loop using the apparatus of FIG. 1, in accordance with one embodiment.

If at step 215, it is determined that the condition flags indicate an address collision, then in accordance with the embodiment described in FIG. 2 a reduced level of vectorisation is employed by branching to a fallback path that is implemented by the sequence of steps shown in the right-hand side of FIG. 2. Purely by way of example, let it be assumed that the sequence of eight address elements are A, B, C, D, E, F, C, H and accordingly there is an address conflict due to the two occurrences of the address element C. The process can be caused to branch to the fallback path in this situation by execution of a conditional branch instruction after the check instruction, with the branch instruction branching to the fallback path in instances whether the flags set by the execution of the check instruction indicate the presence of an address hazard condition.

At step 250, a predicate is initialised to identify only a single lane for processing. Hence, on a first iteration that predicate could be initialised to the value "10000000", assuming that there are eight lanes of processing in accordance with the default level of vectorisation. Thereafter, at step 255, the predicate is used to select one pointer from the operand register zC, in the first iteration this identifying the pointer corresponding to address A. Thereafter, at step 260, the scalar data element identified by that address is loaded, the required vector operation (such as incrementing the value by 1 when considering the earlier histogram problem) is performed, and then the result is stored back to memory using the identified pointer.

Thereafter, at step 265 it is determined whether there are any more active lanes to process, the number of active lanes being dependent on any master predicate specified. Assuming there are more active lanes to process, then the process proceeds to step 270 whether the predicate is adjusted to identify the next active lane having regard to any master predicate that has been specified. Thereafter, the process returns to step 255. Purely by way of example, if the master predicate identifies all eight lanes as containing active elements, or no master predicate is specified, it will be appreciated that the process of steps 255, 260, 265 is repeated eight times, for each of the address elements in turn, whereafter at step 265 it will be determined that there are no more active lanes to process. At this point, the processing returns to the full vector path, and in particular returns to step 235 where the offset x is now incremented by the vector length. At this point, it is appropriate to increment the offset x by the vector length, since all active address elements in the vector register zC will have been processed through iterative execution of the steps illustrated in the right-hand side of FIG. 2. The process can then proceed to the next vector loop iteration via step 240.

In accordance with the check instruction of variant 1, it will be appreciated that when step 210 is performed, the address comparison process can terminate early in some situations. In particular, as soon as an address collision has been detected, the flags can be set accordingly, and there is no need to perform any further address comparisons to determine whether there any further address collisions. This can provide for a very efficient check process.

Further, it will be seen that the fallback path is implemented in a very efficient manner. In particular, whilst the required data is loaded in a scalar manner, there is no need to perform any scalar operations to load in the required addresses, since all of the required addresses are available within the vector register zC, and by using and adjusting the predicate as discussed earlier with reference to steps 250, 270, it is possible to identify in turn each active address element to be processed without performing any further load operations for those address elements.

It will be appreciated that the process of FIG. 2 could be implemented in a variety of ways. However, for completeness, the following code sequence illustrates one example implementation that can be used to perform the process of FIG. 2:

```
mov x1, #0
dup z2.s, #1
```

```
    pfirst p1.b, p0, p1.b
    whilelt p0.s, x1, SIZE
.LloopA:
    ld1w z0.s, p0/z, [xC, x1, lsl #2]    // Contiguous load into z0
    check p0, z0.s
    b.ne .Lfallback                       // Fallback sequence used when
                                          // check fails
    ld1w z1.s, p0/z, [x0, z0.s, uxtw]    // Gather using z0
    add z1.s, p0/z, z1.s, z2.s            // Predicated addition
    st1w z1.s, p0, [x0, z0.s, uxtw]       // Scatter using z0
.Llabel1:
    incw x1, ALL                          // Advance by number of vector
                                          // elements processed
    whilelt p0.s, x1, SIZE                // Check array limits and trim
                                          // predicate
    b.first .LloopA
    ......
    ......
.Lfallback:
    pfirst p1.b, p0, p1.b
.LfallbackLoop:
    lastb x2, p1, z0.s
    ldr x3, [x2]
    add x3, x3, #1
    str x3, [x2]
    pnext p1.s, p0, p1.s
    b.any .LfallbackLoop
    b .Llabel1
```

In accordance with the first variant of the check instruction, any occurrence of an address conflict causes the relevant flag or flags to be set, and for processing to branch to the fallback path, where the current vector loop iteration is actually implemented by an iterative sequence of scalar operations. In accordance with an alternative embodiment the check instruction can go further than merely setting flags, and in particular can set a guard predicate to identify exactly which addresses are giving rise to conflicts. As will be discussed later with reference to FIG. 3, whilst this introduces some additional steps to implementation of the check operation, it allows the fallback path to be implemented by iterative execution of vector operations that operate on a reduced vector length, and hence can enable the fallback path to be implemented faster. Accordingly, in one embodiment a second variant of the check instruction is as follows;

Variant 2: CHECK Pd.<T>, Pg/Z, Zn.<T>  //flag-setting with predicate
                                        //generation In this variant the operand Zn again identifies a vector of address elements upon which the check operation is to be performed, with the type information T identifying the size of each element within that vector. In addition, the variable Pd identifies the result predicate into which guard predicate information is to be stored to indicate the active elements belonging to a first set of elements up to and including the element at which the first address collision occurs. Again, the type information T is used to identify the size of each address element governed by each item of predicate information. As with variant 1, a master predicate can be identified via the predicate register Pg, in this example, the "/Z" indicating that, within the result predicate, any inactive lanes as indicated by the master predicate should be zeroed. This ensures that the result predicate can only be a subset of the master predicate.

Figure 3:
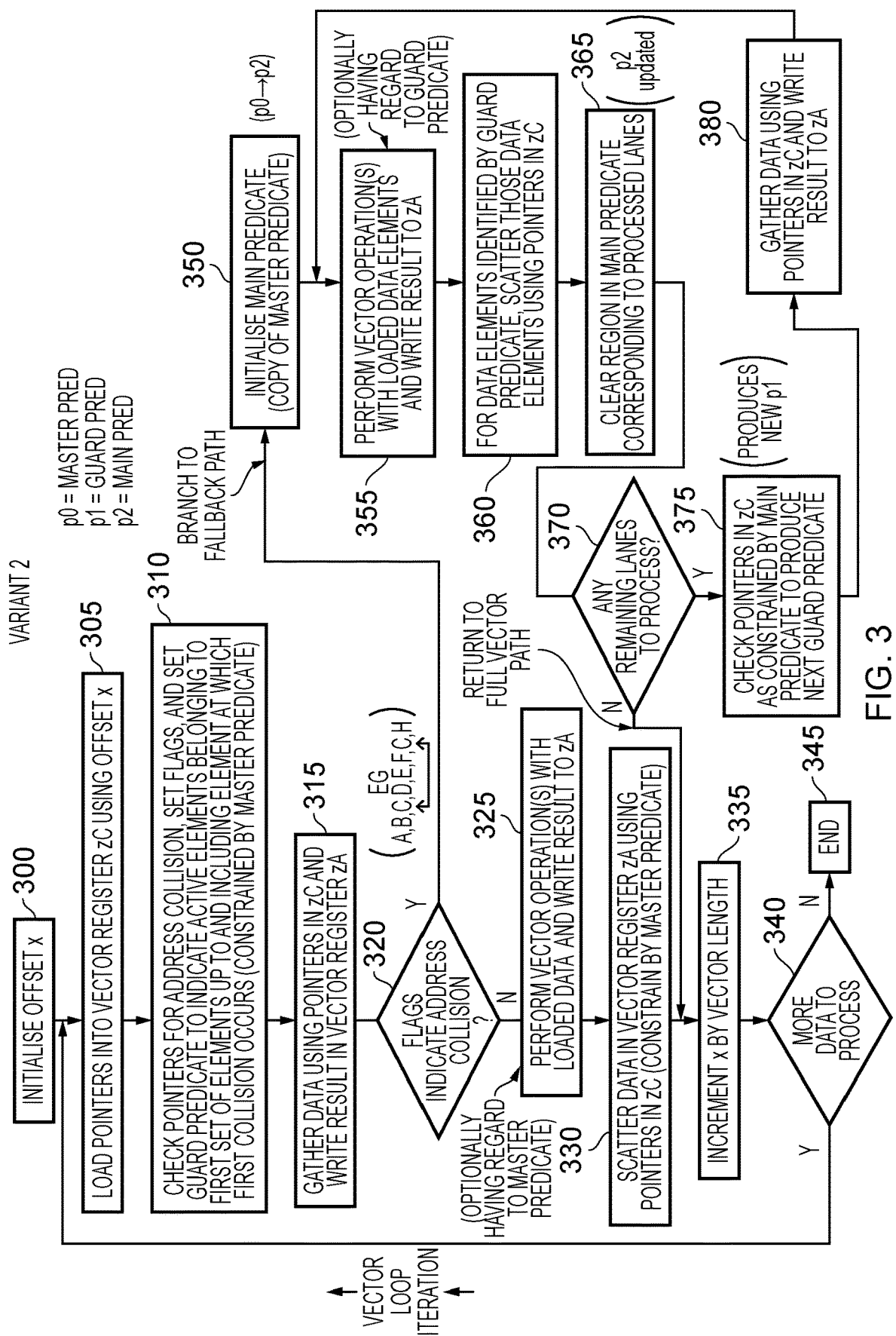
FIG. 3 is a flow diagram illustrating the execution of a vector loop using the apparatus of FIG. 1, in accordance with an alternative embodiment.

FIG. 3 is a flow diagram illustrating a sequence of steps that can be performed to implement each iteration of a vector loop in order to perform an operation equivalent to that discussed earlier with reference to FIG. 2. Steps 300 and 305 correspond to steps 200 and 205 of FIG. 2, and accordingly result in the vector register zC being populated with a sequence of data items retrieved from memory using the offset x, where each of those data items forms an address element. At step 310, performance of the check operation in response to execution of variant 2 of the check instruction causes each of the pointers in vector register zC to be checked for address collisions, the flags to be set accordingly, and in addition a guard predicate to be set to indicate the active address elements belonging to a first set of elements up to and including the element at which the first collision occurs. As discussed earlier, when setting the guard predicate, this is constrained by the master predicate, and hence an address collision will not be found in respect of any address element associated with an inactive lane as indicated by the master predicate.

Thereafter, the process proceeds to step 315 where the data is gathered using the pointers in the vector operand zC, and the results are written into the vector register zA.

At step 320, the flags are assessed in order to indicate whether an address collision has been found. If not, the process proceeds to steps 325, 330, 335, 340, which correspond to steps 225, 230, 235, 240 of FIG. 2. As with the step 225 of FIG. 2, during step 325 of FIG. 3, the vector operations may be constrained to only be performed on loaded data that is identified as being within an active lane of parallel processing as indicated by the master predicate, assuming a master predicate has been specified.

If at step 320 it is determined that the flags do indicate the presence of an address collisions, then the process branches to a fallback path, for example using the same mechanism as discussed earlier with reference to FIG. 2 through execution of a branch instruction. Purely for the sake of illustration, it is assumed that the same address conflict is found when performing the operations of FIG. 3 as was found for the specific example discussed earlier with reference to FIG. 2, and hence the address element C is found in the third and seventh lanes of parallel processing. Accordingly, the process proceeds to step 350, where a main predicate is initialised to be a copy of the master predicate. For the purposes of the following discussion, it will be assumed that the master predicate is p0, the guard predicate is p1 and the main predicate is p2. As will be discussed in more detail later, the reason that the main predicate is created is because, during each iteration of the fallback path, the main predicate value is updated, and it is not desired to corrupt the value of the master predicate which needs to be maintained for other purposes.

The process then proceeds to step 355 where vector operations are performed with the loaded data elements and the results are written into the register zA. Optionally, the execution of step 355 is constrained having regards to the guard predicate so as to avoid any unnecessary data processing operations being performed. However, in other embodiments, due to the way in which the vector processing circuitry is arranged, it may be just as efficient to perform the operations on all of the lanes of parallel processing, and then later to discard the results that are not needed having regards to the guard predicate.

At step 360, for the data elements identified by the guard predicate, those data elements are scattered back to memory using the relevant pointers in the vector register zC. Thereafter, at step 365 the region in the main predicate corresponding to the processed lanes is cleared, resulting in an updated main predicate p2. The process then proceeds to step 370, where it is determined whether there are any remaining lanes to process. If not, then processing can return to the full vector path, and in particular the process can branch to step 335. However, assuming there are remaining lanes to process, then a further check operation is performed to check the pointers in the vectors operand zC as constrained by the main predicate in order to produce the next guard predicate. Assuming for the sake of illustration that the master predicate identifies all eight lanes as being active, and the address conflict is as illustrated in FIG. 3, i.e. the address elements are A, B, C, D, E, F, C, H, then the initial guard predicate would have been "11100000". After the first iteration through steps 355, 360, 365, then the main predicate would be updated to become "00011111" and accordingly when performing step 375, where the check process is constrained by the new main predicate, this would produce an updated guard predicate of "00011111", since no further address conflicts would be found.

Following step 375, then at step 380 the data is gathered using the pointers in zC and the results are written to the register zA. It is necessary at step 380 to regather the data, since the scatter operation performed at step 360 will have potentially changed the value of one or more of the data items required, and hence it would be inappropriate to rely on the data that had previously been gathered at step 315. The process then returns to step 355 where the next iteration of the fallback path is performed.

The following text discusses specific example forms of the various predicates used within the process of FIG. 3. For the sake of illustration, assume that the master predicate is of the form "11111100", it being assumed that there are eight lanes of parallel processing in accordance with the default level of vectorisation. This identifies that all lanes, apart from the last two lanes, contain active elements. When performing the address conflict check at step 310, it is assumed that this results in the generation of an initial guard predicate of the form "11100000". The presence of an address collision will be detected at step 320, and the process will branch to the fallback path, where the main predicate p2 is initialised to be equal to the master predicate, and hence takes the value "11111100". During the first iteration of the fallback path, after the scatter operation is performed at step 360, the main predicate will be updated at step 365 to take the new form "00011100", i.e. to discount the first three lanes that have been processed as a result of the first iteration of the fallback path.

After the further check is performed at step 375, this will result in an updated guard predicate. For the sake of illustration, it is assumed that another address conflict is identified between the fifth lane and the sixth lane and accordingly the guard predicate p1 is updated to become "00011000".

During the second iteration of the fallback path, following the scatter operation at step 360, the main predicate will be updated at step 365 to take the form "00000100". The check then performed at step 375 is a nominal check, since there is only one remaining active address element, and accordingly the resulting guard predicate will be of the form "00000100". As a result, the final iteration of the fallback path is effectively a scalar iteration, whereafter processing returns to the full vector path to begin the next vector loop iteration.

It will be appreciated that the process of FIG. 3 can be implemented in a variety of ways, but one example code sequence for implementing the process of FIG. 3 if as follows:

```
        mov x1, #0
        dup z2.s, #1
        pfirst p1.b, p0, p1.b
        whilelt p0.s, x1, SIZE
.LloopA:
        ld1w z0.s, p0/z, [xC, x1, lsl #2]    // Contiguous load into z0
        check p1.s, p0/z, z0.s
        ld1w z1.s, p0/z, [x0, z0.s, uxtw]    // Gather using z0
        b.ne .Lfallback                       // Fallback sequence used when
                                              // check fails
        add z1.s, p0/z, z1.s, z2.s           // Predicated addition
        st1w z1.s, p0, [x0, z0.s, uxtw]      // Scatter using z0
.Llabel1:
        incw x1, ALL                          // Advance by the number of vector
                                              // elements processed
        whilelt p0.s, x1, SIZE                // Check array limits and trim
                                              // predicate
        b.first .LloopA
        ......
        ......
.Lfallback:
        mov p2, p0
.LfallbackLoop:
        add z1.s, p1/z, z1.s, z2.s           // Predicated addition
        st1w z1.s, p1, [x0, z0.s, uxtw]      // Scatter using z0
        bics p2.b, p0/z, p2.b, p1.b          // Disable group of lanes which
                                              // have already been processed and set flags
        b.none .Llabel1
        check p1.s, p2/z, z0.s
        ld1w z1.s, p1/z, [x0, z0.s, uxtw]    // Gather using z0
        b .LfallbackLoop
```

Figure 4:
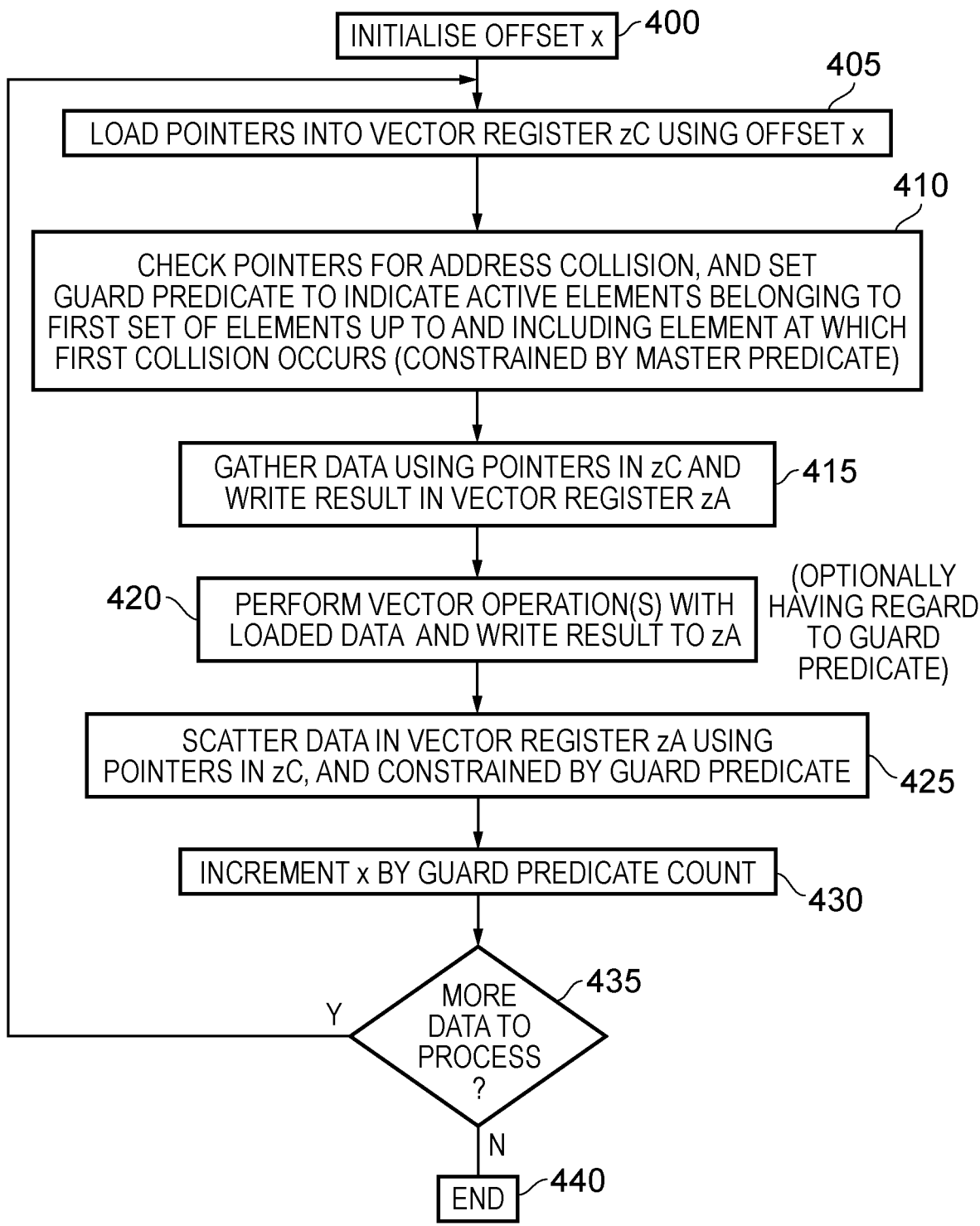
FIG. 4 is a flow diagram illustrating the execution of a vector loop using the apparatus of FIG. 1, in accordance with a yet further embodiment.

In both of the examples illustrated with reference to FIGS. 2 and 3, in each iteration of the vector loop it is possible to selectively reduce the level of vectorisation employed within that iteration by branching to a fallback path in the presence of a detected address hazard condition. However, in an alternative embodiment, a reduced level of vectorisation within an iteration of the vector loop can be employed without providing a separate fallback path. FIG. 4 is a flow diagram illustrating the steps performed in accordance with such an alternative embodiment, it being assumed in FIG. 4 that the check instruction of variant 2 is executed, and accordingly generates a guard predicate. Steps 400, 405 and 410 correspond with steps 300, 305 and 310 of FIG. 3, with the exception that at step 410 there is no need for any flags to be set, as there is no subsequent branch instruction which decides whether to continue with the default level of vectorisation, or branch to a fallback path, dependent on the status of such flags.

Instead, the process proceeds after step 410 to step 415 where a vector of data values is gathered form memory using the pointers in the vector register zC, with the result being written in the vector register zA. If desired, in one embodiment the gather operation can be constrained by the guard predicate generated at step 410.

Then, the process proceeds to step 420, where vector operations are performed on the loaded data with the results then being written back to the destination register zA. Again, the operations can, if desired, be constrained having regard to the guard predicate, so that those operations are only performed on the active elements identified by the guard predicate.

The process then proceeds to step 425 where the data in the vector register zA is scattered using the pointers in the vector register zC, but constrained by the guard predicate. Accordingly, it will be appreciated that the only result data written back to memory during the scatter operation pertains to the processing lanes that the guard predicate has identified as being active based on the check operation performed at step 410. Hence, it will be appreciated that, in the absence of an address conflict condition being detected, the default level of vectorisation is employed during the performance of steps 415, 420 and 425, whereby all active lanes are processed, constrained only by any master predicate specified. However, in the event of an address hazard condition being detected, a reduced level of vectorisation is employed during steps 415, 420, 425, by constraining at least the scatter operation having regards to the guard predicate, which will only identify as active lanes a subset of the lanes indicated by the master predicate. Thereafter, at step 430, the offset x is incremented by the guard predicate count. Hence, if the guard predicate identified only three active lanes, the offset x would be incremented by 3. In contrast, in any iteration where an address conflict condition is not detected, the guard predicate will effectively identify that there is no constraint on the lanes processed, and accordingly in such an iteration the offset x will be incremented by the vector length at step 430.

At step 435, it is determined whether there is more data to process, and if so the process returns to step 405. It should be noted that at step 405, irrespective of whether the default level of vectorisation, or the reduced level of vectorisation, was employed in the preceding iteration, the process will always revert back to the default level of vectorisation for the next iteration, and accordingly the number of pointers loaded into the vector register zC will be dependent on the vector length.

When at step 435 it is determined that there is no more data to process, then the process ends at step 440.

Whilst in the above description of FIG. 4, it is assumed that the check instruction executed is essentially the same as variant 2, albeit without any flag setting being necessary, in an alternative embodiment another variant of check instruction could be used that, rather than generating a guard predicate, generates as an output a number indicative of the number of active elements to be processed during the current iteration. Where no address conflict is detected, that number will merely indicate the normal vector length, and the downstream processing within the iteration will hence not be constrained, other than by any master predicate specified for the operation. However, in the presence of the address conflict condition being detected, the number will identify a reduced number of active elements to be processed in the current iteration, and hence a reduced level of vectorisation to be employed for that iteration.

In addition to the above variants of the check instruction discussed with reference to the preceding figures, it is also possible to create variants that combine the check operation with other operations. For example, in one embodiment the check operation could be combined with a memory access operation, so that on execution of that single instruction, both the above described check operation is performed, but in addition a memory access operation is performed having regard to the plurality of memory addresses specified by the instruction. As one particular example, a variant of the check instruction could be created to provide a hazard-aware gather operation referred to herein as variant 3 and illustrated below:

Variant 3: LDCHECK Zd.<T>, Pg/Z, [<Xn|SP>, <Zm>.<T>]

In this example, the scalar register Xn or the stack pointer register SP are used to contain a base pointer, and the vector register Zm then provides a vector of offsets, with the type field T identifying the size of the elements within that vector register. The vector register Zd identifies the destination register for the gather operation, and the type field T identifies the size of the data elements contained with that vector. A master predicate can be specified via the predicate register Pg, and the notation "/Z" identifies that any data elements within the result vector Zd will be zeroed if the equivalent lane is marked as inactive by the master predicate.

When executing such a load check instruction, the check for address conflicts can be performed within the processing circuitry 115, while the LSU 145 performs the gather operation. By overlapping the performance of the check operation with the gather operation, this can enable further performance improvements. In such a scenario, the gather and check operations are effectively dual issued, which can enable the information about imminent address conflicts to terminate the gather early and save time. Hence, in such an embodiment, there is the option to provide for early termination of the gather operation based on the hazard check results, so that once a hazard has been detected, later stages of the gather operation are not performed. In some embodiments, it may also be possible to utilise the hardware available for performing the gather operation to assist with the address checking operation, thereby providing a particularly efficient implementation.

When executing such a combined check and gather instruction, the result of the check operation can be used to set the CPU condition flags to indicate the presence or absence of race conditions, as per the earlier described embodiments. However, alternatively, the check results can be used to set a CPU system or status register such as the HCSR register 165 discussed earlier with reference to FIG. 1. For example, the HCSR register can be arranged to provide information on which load accesses were not performed because of address conflicts and will contain Boolean values, for example a set of "1"s followed by consecutive "0"s (where the "0"s start in the lane after the first lane in which a collision was detected). Code can then be added separately to check the status bits at a lower cost than if the check was performed by a set of separate instructions.

Hence, the status bits can be checked and used later to set condition flags if desired, in order to implement reduced levels of vectorisation in the presence of address conflicts.

An added benefit of such an approach is that the same instruction can also be used when it is desired merely to implement a standard vector load operation, i.e. where no check is required. In particular, in that instance the check will still be performed in parallel with the load, with the results being written in the HCSR register, but the contents of the HCSR register can then merely be ignored. Such an approach can be very useful where instruction encoding space is limited, and accordingly it is difficult to find sufficient encoding space to separately encode all of the various instructions that may be desired.

Whilst in the above described discussions of the check instruction of variants 1, 2 and 3, a single input vector operand is provided, in an alternative embodiment each of those variants can also be designed to take a second input vector operand. This could for example be useful in cases where there are gather operations from a first set of arbitrary memory locations, and the data values loaded and processed are subsequently provided to scatter operations to a second set of arbitrary memory locations. This use-case can occur, for example, within algorithms that perform in-place data transformations.

When considering situations in which to use the various described check instructions, the latencies involved in the performance of the required check operations may be considered. The latencies pertain to the comparisons which need to be performed, and the various comparisons are highlighted in FIG. 5 for a vector with a vector length of six, and hence comprising vector elements 0 to 5. As shown by line 500, vector element 5 needs to be compared with each of vector elements 4, 3, 2, 1 and 0. Similarly, as shown by line 505, vector element 4 needs to be compared with vector elements 3, 2, 1 and 0. Further, vector element 3 needs to be compared with vector elements 2, 1 and 0 as indicated by line 510, whilst vector element 2 needs to be compared with vector elements 1 and 0 as indicated by line 515. Finally, vector element 1 needs to be compared with vector element 0 as indicated by line 520. The dashed lines in FIG. 5 illustrate how the comparisons can be grouped. For a given vector length, VL, the number of comparisons which must be performed is $(VL-1) \times (VL)/2$. Hence, for a vector length of 6, 15 comparisons are needed, as shown schematically in FIG. 5.

However, there is a difference in latency between performance of the check instruction of variant 1 and performance of the check instruction of variant 2. In particular, when considering variant 1, it is possible to use most of the existing data path within modern CPUs. In particular, as shown in FIG. 6, a rotator 550 can be used to provide one of the inputs to a comparator 560, with the other input coming from the source vector operand. Such an approach efficiently assembles and "compacts" or "folds" the groupings marked in FIG. 5. This is usually one of the permutations that can be performed in-flight as data is being fed to the integer execution pipelines in a CPU. Using this rotator, a relatively lightweight implementation can deliver a latency that is proportional to VL/2. As shown in FIG. 6, the outputs from the comparator can then be used to set the CPU condition flags 570. The variant 2 of the check instruction discussed earlier has a higher latency, as the order of the comparisons matters, and accordingly it is necessary to scan each sub-section of the vector.

Figure 7A:
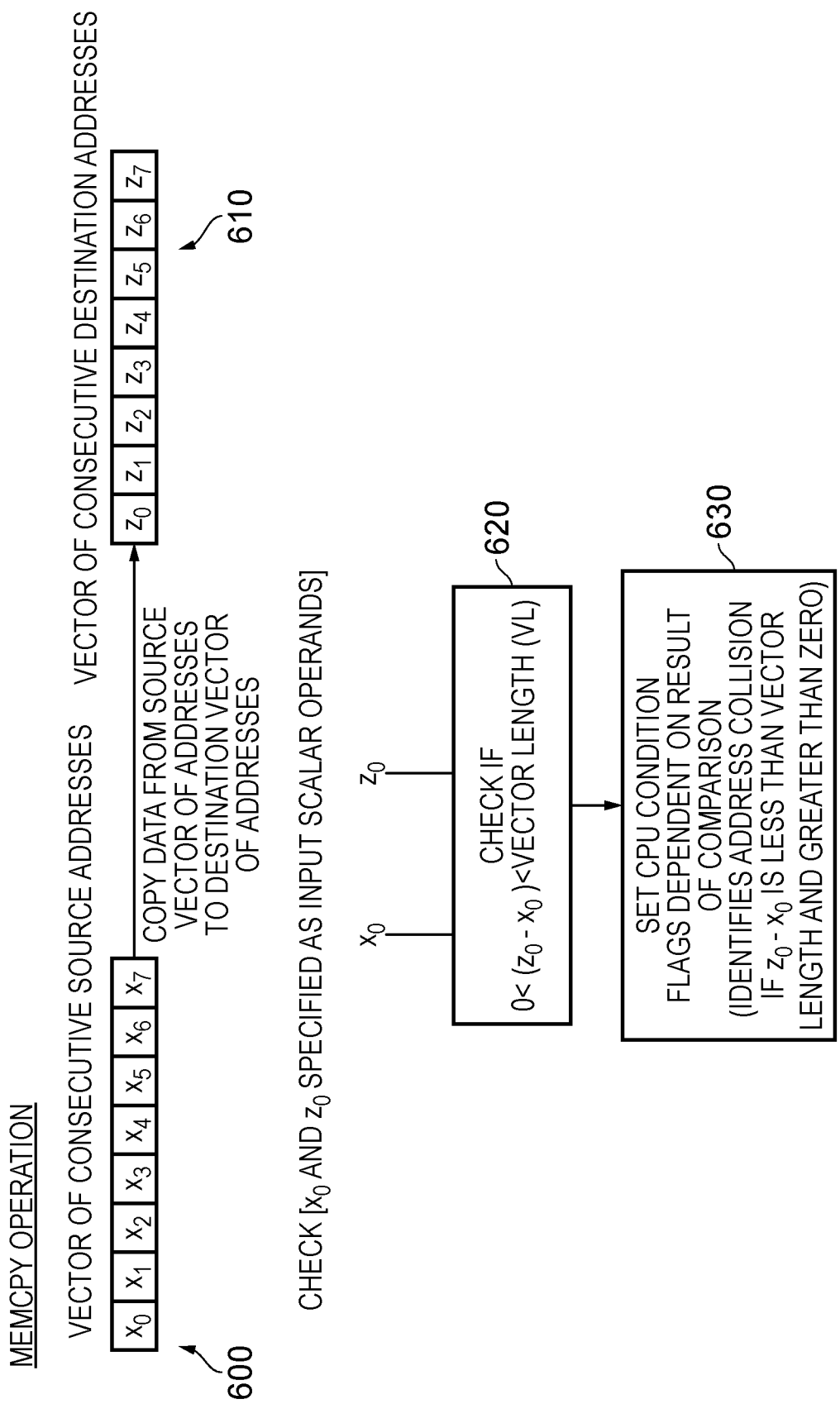

Additional variants of check instructions can be created for situations where the vectors of addresses being processed relate to consecutive addresses. In particular, in use cases which access contiguous memory locations, such as the memory copy scenario discussed earlier as "use case 2", such instructions can be useful, and by providing a more efficient mechanism for performing the necessary address conflict check. In particular, since the memory accesses are contiguous, the check instruction can be substantially simplified. This is illustrated in FIG. 7A when considering the memory copy operation where data is copied from a vector of consecutive source addresses 600, with that data then being written to a vector of consecutive destinations addresses 610. With knowledge of the vector length, which is dependent on the number of elements in each vector, and the size of those elements, it is possible to perform the required address conflict check using only scalar operands. In particular, the check instruction can specify one of the address elements from the source vector and a corresponding address element from the destination vector, in one embodiment it being assumed that the first elements $x_0$ and $z_0$ are the chosen address elements for the check operation. As shown at step 620, when provided with these two scalar address elements, the check operation can then determine if the difference $z_0-x_0$ is greater than or equal to the vector length, or is negative or 0. If so, then it can be ensured that there will be no address conflicts when copying data from the vector of source addresses 600 and then writing that data into the vector of destination addresses 610. However, if the difference $z_0-x_0$ is less than the vector length and greater than 0, then an address conflict will arise.

At step 630, the CPU condition flags can be set dependent on the results of the comparison, in order to identify an address collision if the difference $z_0-x_0$ is less than the vector length and greater than 0.

In an alternative embodiment, it may be decided for implementation reasons to perform a different check at step 620, and in particular to perform a check to detect situations where the absolute difference between the two scalar address values provided as an input is not greater than or equal to the vector length. If the absolute difference is less than the vector length, this can indicate the presence of a conflict, and the conditions flags can be set accordingly at step 630. However, from the earlier mentioned inequality discussed with reference to step 620 of FIG. 7A, it will be appreciated that a check based on absolute differences will produce some false positives, since there are actually no race conditions when the signed integer result of the calculation $z_0-x_0$ is less than the vector length and also negative or equal to 0.

Variants of the check instruction can be produced to perform the check discussed in FIG. 7A, and the following variants 4 and 5 are such variants of the check instruction provided as an alternative to variants 1 and 2, respectively:

| | |
|---|---|
| Variant 4: CHECK<T> Pg, Xn, Xm | //flag-setting only |
| Variant 5: CHECK<T> Pd.<T>, Pg/Z, Xn, Xm | //flag-setting with predicate<br>// generation. |

As shown in variant 4, two scalar input values Xn and Xm are provided, these identifying registers containing the address elements $x_0$ and $z_0$, respectively. If desired, a master predicate can be provided to identify the number of active lanes, and the type information T is used to identify the data element size, thereby enabling the vector length VL to be calculated. The predicate information can also be used when calculating the effective vector length. For example, if the last two data element lanes are excluded in the example of FIG. 7, then rather than the effective vector length being eight times the address element size, the effective vector length is six times the address element size, and this can be taken into account when determining whether the difference $z_0-x_0$ is greater than or equal to the relevant vector length, or is negative or 0.

Variant 5 above is the predicate-generating version of variant 4, which generates a predicate with the result in each active lane set to "true" if no conflict is detected, e.g. if the difference $z_0-x_0$ is greater than or equal to the vector length, or is negative or 0. However, in the event of a conflict being detected, and assuming the difference $z_0-x_0$ to be "y", then a predicate is produced with a contiguous set of "y" elements set to true, and with the remaining elements set to false. This can be used as a control mask for the loop.

Figure 7B:
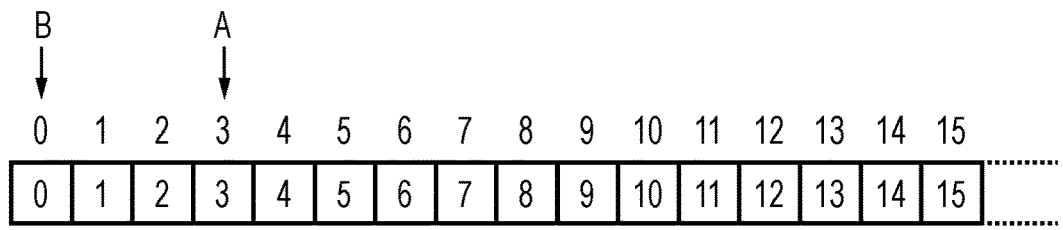
Figure 7C:
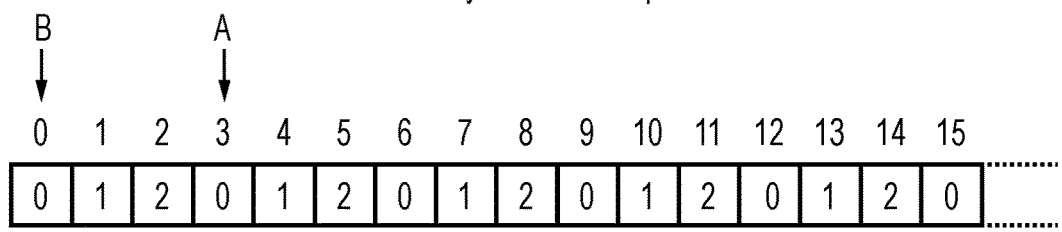
Figure 7D:
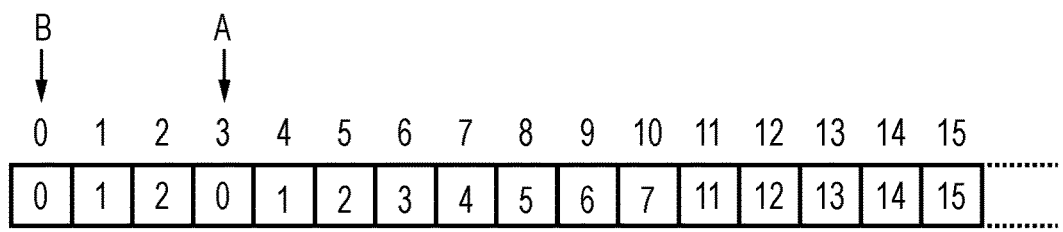

The above predicate setting check mechanism is illustrated by way of example in FIGS. 7B to 7E. FIG. 7B illustrates an initial sequence of values, with A being the destination pointer and B being the source pointer. If the vector length is 8, it will be seen in this example that a conflict is detected based on the check performed at step 620 of FIG. 7A. FIG. 7C illustrates what the content of memory would be if the memcpy operation is performed as a series of scalar operations, and hence indicates the required result for any vectorised form of the operation. FIG. 7D illustrates the contents of the memory that would result if the memcpy operation was vectorised without adopting the check mechanism of the described embodiments.

Figure 7E:
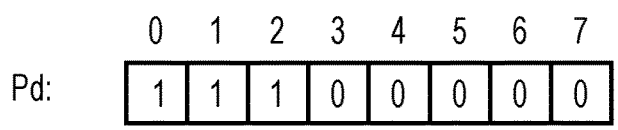

Finally, FIG. 7E shows the guard predicate that would be formed in one embodiment if the check instruction of variant 5 were executed, this predicate then being used to ensure that only three elements are processed during each iteration, and hence the result illustrated in FIG. 7C is obtained.

It should further be noted that a corollary definition for a special check instruction can be derived for the case where the elements being loaded contiguously happen to be reversed.

When the instruction set provided for use by the apparatus of FIG. 1 provides multiple different variants of the check instruction, it may be the case that the compiler cannot statically determine the best variant for many workloads of interest. In order to take advantage of the various performance benefits offered by the different variants of check instruction discussed above, the earlier mentioned address collision statistical counters 170 can be utilised. In one embodiment, these counters can be used not only to identify the total number of collisions detected in any given epoch, but also (or alternatively) the total number of intra-vector collisions, i.e. the number of collisions within a particular vector length. By recording such information within the counters 170, this enables software to estimate the average number of intra-vector collisions per address vector. This statistic can then be used by dynamic optimisation tools or an intelligent run-time to select the best instruction variant for a given computational workload. This is illustrated by way of example with reference to the flow diagram of FIG. 8, which illustrates a dynamic compilation process performed using the statistical counter information.

At step 700, the address collision statistical counters are maintained for a given epoch of time. At step 705, it is determined whether the predetermined time has elapsed, and if not the process returns to step 700, where the address collision counters continue to be maintained as instruction sequences are executed by the apparatus. Once the predetermined time has elapsed, then the address collision statistical counters are analysed at step 710 in order to determine the average number of intra-vector collisions per address vector. This information is then used to select the appropriate check instruction at step 715, whereafter that selected check instruction variant is then inserted into the code at step 720, along with any associated sequence of instructions, for example the fallback path instructions discussed earlier with reference to the examples of FIGS. 2 and 3. Thereafter, at step 725, the counter can optionally be reset, prior to returning to step 700.

FIG. 9 is a graph used to illustrate how such a compilation process can be useful, and in particular how the speedup benefits obtainable form the different variants can differ dependent on the percentage of vectors with intra-vector conflicts. In particular, the results in FIG. 9 show the potential speedup of vectorised code over a scalar implementation for both the variant 1 check instruction and the variant 2 check instruction, dependent on the percentage of vectors with intra-vector conflicts that occur. For variant 1, there is a single curve 750, since as will be apparent from the earlier discussion of FIG. 2, when adopting variant 1 any address collision causes the current iteration of the vector loop to be performed as an iterative sequence of scalar operations. However, for variant 2, the speedup depends on the number of address conflicts detected within a particular vector. The "numparts" values shown in FIG. 9 indicate the number of iterations through the fallback path of FIG. 3 required to implement a current iteration of the vector loop. As is apparent from the graph, variant 2 is advantageous when the average number of address collisions within a vector is low, and the speedup decreases as the number of intra-vector address collisions increases.

It should also be noted that the likelihood that there would be more than a single collision within a vector also increases as the vector length increases, and accordingly for wider vectors the variant 1 check instruction may scale better.

FIG. 10 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 830 typically running a host operating system 820 supporting a virtual machine program 810. Often, large powerful processors are required to provide virtual machine implementations which execute at a reasonable speed, but such an approach may be justified in certain circumstances, such as when there is a desire to run code native to another processor for compatibility or re-use reasons. The virtual machine program 810 is capable of executing an application program (or operating system) 800 to give the same results as would be given by execution of the program by such a real hardware device. Thus, the program instructions, including the check instructions described above, may be executed from within the application program 800 using the virtual machine program 810.

From the above described embodiments, it will be seen that the use of the described check instructions provides a low-overhead solution to the issue of potential memory dependence violations when code with irregular or nonlinear memory access patterns is vectorised. It has been found that the described techniques can greatly improve the performance of programs which have indirect memory references, particularly those whose memory accesses are nonaffine and such that it is difficult or impossible to prove statically that there are no race conditions, or even determine the average frequency of such hazards for different vector lengths.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus, comprising:
a register store to store vector operands, each vector operand comprising a plurality of elements;
execution circuitry to execute instructions in order to perform operations specified by the instructions, the execution circuitry comprising access circuitry to perform memory access operations in order to move the vector operands between the register store and memory, and processing circuitry to perform data processing operations using said vector operands;
the execution circuitry being arranged to iteratively execute a vector loop, during each iteration the execution circuitry being arranged to execute a sequence of instructions to implement the vector loop, said sequence including a check instruction identifying a plurality of memory addresses, and the execution circuitry being responsive to execution of the check instruction to determine whether an address hazard condition exists amongst the plurality of memory addresses;
for each iteration of the vector loop, the execution circuitry being responsive to execution of the check instruction determining an absence of said address hazard condition, to employ a default level of vectorisation when executing the sequence of instructions to implement the vector loop, and being responsive to execution of the check instruction determining a presence of said address hazard condition, to employ a reduced level of vectorisation when executing the sequence of instructions to implement the vector loop,
wherein the execution circuitry is responsive to execution of the check instruction determining the absence of said address hazard condition, to employ said default level of vectorisation by executing a first plurality of instructions within said sequence of instructions to implement the vector loop,
wherein the execution circuitry is responsive to execution of the check instruction determining the presence of said address hazard condition, to employ said reduced level of vectorisation by iteratively executing a second plurality of instructions independent of the first plurality of instructions within said sequence of instructions to implement the vector loop,
wherein the execution circuitry is responsive to execution of said check instruction to generate result data indicating whether said address hazard condition exists, for reference by a subsequent instruction in said sequence, and
wherein the execution circuitry is configured to generate said result data by updating one or more condition flags, and said subsequent instruction is a branch instruction which, when executed by the execution circuitry, references the one or more condition flags in order to determine whether to execute said first plurality of instructions or whether to iteratively execute said second plurality of instructions.

2. An apparatus as claimed in claim 1, wherein said second plurality of instructions comprise scalar instructions which cause the execution circuitry to operate on individual elements, and the number of iterative executions of said second plurality of instructions required to implement the vector loop is dependent on a number of active elements of the vector operands associated with said default level of vectorisation.

3. An apparatus as claimed in claim 1, wherein:
the execution circuitry is responsive to execution of said check instruction to generate a guard predicate with an initial predicate value;
said second plurality of instructions comprise vector instructions which cause the execution circuitry to operate in parallel on a subset of the elements of one or more vector operands, said subset being identified by the guard predicate; and
on each iteration of the second plurality of instructions the predicate value of the guard predicate is updated to exclude any elements of the one or more vector operands operated on by any preceding iteration.

4. An apparatus as claimed in claim 3, wherein the guard predicate is constrained to identify a subset of the elements that are active elements identified by a master predicate.

5. An apparatus as claimed in claim 1, wherein:
said default level of vectorisation identifies a first number of active elements, and the execution circuitry is arranged, in response to execution of the check instruction determining the absence of said address hazard condition, to process said first number of elements in parallel when executing the sequence of instructions to implement the vector loop; and
the execution circuitry is responsive to execution of the check instruction to generate a control output that reduces the number of active elements to a second number of active elements less than said first number when execution of the check instruction determines the presence of said address hazard condition, to cause the execution circuitry to employ said reduced level of vectorisation by processing said second number of elements in parallel when executing the sequence of instructions to implement the vector loop.

6. An apparatus as claimed in claim 5, wherein at the start of each iteration of the vector loop, the execution circuitry is arranged to revert to employing the default level of vectorisation.

7. An apparatus as claimed in claim 5, wherein the control output comprises a guard predicate identifying the active elements forming said second number of active elements.

8. An apparatus as claimed in claim 1, wherein the check instruction specifies at least one vector operand comprising a plurality of active address elements, and the execution circuitry is arranged, on executing the check instruction, to compare each active address element with each other active address element in order to determine whether said address hazard condition exists.

9. An apparatus as claimed in claim 1, wherein the check instruction specifies a first address associated with a first sequence of contiguous addresses and a second address associated with a second sequence of contiguous addresses, and the execution circuitry is arranged, on executing the check instruction, to determine the presence of the address hazard condition dependent on a difference between the first address and the second address.

10. An apparatus as claimed in claim 1, wherein said check instruction is a check and memory access instruction, the execution circuitry being responsive to execution of the check and memory access instruction to perform a check operation to determine whether the address hazard condition exists amongst the plurality of memory addresses whilst also performing a memory access operation in respect of the plurality of memory addresses.

11. An apparatus as claimed in claim 10, wherein the execution circuitry is arranged, on determining the presence of the address hazard condition, to terminate any remaining portion of the memory access operation.

12. An apparatus as claimed in claim 1, wherein the processing circuitry comprises dedicated check circuitry to perform a check operation on execution of the check instruction.

13. An apparatus as claimed in claim 1, wherein the processing circuitry comprises a processing unit for performing data processing operations, and the processing unit is reused for performing a check operation on execution of the check instruction.

14. An apparatus as claimed in claim 13, wherein rotator circuitry and comparator circuitry within the processing unit are used to merge one or more address comparisons required during the performance of the check operation.

15. An apparatus as claimed in claim 1, further comprising a hazard check status register into which the execution circuitry is arranged to store the result data produced by execution of the check instruction.

16. An apparatus as claimed in claim 1, wherein each vector operand comprises N elements, and N active elements are associated with said default level of vectorisation so that the execution circuitry is responsive to execution of the check instruction determining an absence of said address hazard condition, to process N elements in parallel when executing the sequence of instructions to implement the vector loop.

17. An apparatus as claimed in claim 1, wherein each vector operand comprises N elements, a master predicate identifies as active elements a number of elements less than or equal to N, and said default level of vectorisation corresponds to the active elements identified by the master predicate, so that the execution circuitry is responsive to execution of the check instruction determining an absence of said address hazard condition, to process in parallel the active elements identified by the master predicate when executing the sequence of instructions to implement the vector loop.

18. An apparatus as claimed in claim 1, further comprising:
   counter circuitry to maintain history data relating to occurrences of the address hazard condition for previously executed instruction sequences; and
   the execution circuitry being arranged to operate under control of an instruction set that includes a plurality of different types of check instruction;
   whereby the history data is made available to a compiler to enable the compiler to determine which type of check instruction to use within the vector loop taking account of said history data.

19. An apparatus as claimed in claim 18, wherein, for a selected time period, the history data identifies at least one of a total number of address collisions detected and a number of address collisions detected within a vector length of the vector operands.

20. A method of managing address collisions when performing vector operations in an apparatus having a register store to store vector operands, each vector operand comprising a plurality of elements, and execution circuitry to execute instructions in order to perform operations specified by the instructions, the execution circuitry performing memory access operations in order to move the vector operands between the register store and memory, and performing data processing operations using said vector operands, the method comprising:
   iteratively executing a vector loop;
   during each iteration, executing within the execution circuitry a sequence of instructions to implement the vector loop, said sequence including a check instruction identifying a plurality of memory addresses, and the execution circuitry being responsive to execution of the check instruction to determine whether an address hazard condition exists amongst the plurality of memory addresses; and
   for each iteration of the vector loop, in response to execution of the check instruction determining an absence of said address hazard condition, employing a default level of vectorisation when executing the sequence of instructions to implement the vector loop, and in response to execution of the check instruction determining a presence of said address hazard condition, employing a reduced level of vectorisation when executing the sequence of instructions to implement the vector loop,
   wherein the execution circuitry, in response to execution of the check instruction determining the absence of said address hazard condition, employing said default level of vectorisation by executing a first plurality of instructions within said sequence of instructions to implement the vector loop,
   wherein the execution circuitry, in response to execution of the check instruction determining the presence of said address hazard condition, employing said reduced level of vectorisation by iteratively executing a second plurality of instructions independent of first plurality of instructions within said sequence of instructions to implement the vector loop,
   wherein the execution circuitry, in response to execution of said check instruction, generating result data indicating whether said address hazard condition exists, for reference by a subsequent instruction in said sequence, and wherein generating said result data comprises updating one or more condition flags, and said subsequent instruction is a branch instruction which, when executed by the execution circuitry, references the one or more condition flags in order to determine whether to execute said first plurality of instructions or whether to iteratively execute said second plurality of instructions.

21. A non-transitory storage medium storing a computer program for controlling a computer to provide a virtual machine execution environment for program instructions corresponding to an apparatus as claimed in claim 1.

22. An apparatus, comprising:
register store means for storing vector operands, each vector operand comprising a plurality of elements;
execution means for executing instructions in order to perform operations specified by the instructions, the execution means comprising access means for performing memory access operations in order to move the vector operands between the register store means and memory, and processing means for performing data processing operations using said vector operands;
the execution means for iteratively execute a vector loop, during each iteration the execution means for executing a sequence of instructions to implement the vector loop, said sequence including a check instruction identifying a plurality of memory addresses, and the execution means for determining, responsive to execution of the check instruction, whether an address hazard condition exists amongst the plurality of memory addresses;
for each iteration of the vector loop, the execution means being responsive to execution of the check instruction determining an absence of said address hazard condition, for employing a default level of vectorisation when executing the sequence of instructions to implement the vector loop, and being responsive to execution of the check instruction determining a presence of said address hazard condition, for employing a reduced level of vectorisation when executing the sequence of instructions to implement the vector loop,
wherein the execution means is responsive to execution of the check instruction determining the absence of said address hazard condition, to employ said default level of vectorisation by executing a first plurality of instructions within said sequence of instructions to implement the vector loop,
wherein the execution means is responsive to execution of the check instruction determining the presence of said address hazard condition, to employ said reduced level of vectorisation by iteratively executing a second plurality of instructions independent of the first plurality of instructions within said sequence of instructions to implement the vector loop,
wherein the execution means is responsive to execution of said check instruction to generate result data indicating whether said address hazard condition exists, for reference by a subsequent instruction in said sequence, and
wherein the execution means is configured to generate said result data by updating one or more condition flags, and said subsequent instruction is a branch instruction which, when executed by the execution means, references the one or more condition flags in order to determine whether to execute said first plurality of instructions or whether to iteratively execute said second plurality of instructions.

* * * * *